US012609590B2

(12) United States Patent
Bussières et al.

(10) Patent No.: US 12,609,590 B2
(45) Date of Patent: Apr. 21, 2026

(54) ELECTRIC MOTORS AND METHODS OF CONTROLLING THEREOF

(71) Applicants: 121352 CANADA INC., Rouyn-Noranda (CA); Normand Bussières, Rivière-Heva (CA)

(72) Inventors: Normand Bussières, Rivière-Heva (CA); Patrick Martel, Rouyn-Noranda (CA); Mathieu Paré, Oka (CA)

(73) Assignees: 121352 CANADA INC., Rouyn-Noranda (CA); Normand Bussières, Rivière-Heva (CA)

( * ) Notice: Subject to any disclaimer, the term of this patent is extended or adjusted under 35 U.S.C. 154(b) by 34 days.

(21) Appl. No.: 18/747,282

(22) Filed: Jun. 18, 2024

(65) Prior Publication Data

US 2025/0007361 A1 Jan. 2, 2025

Related U.S. Application Data

(63) Continuation of application No. 17/602,501, filed as application No. PCT/CA2021/050568 on Apr. 26, 2021, now Pat. No. 12,046,956.

(Continued)

(51) Int. Cl.
| | |
|---|---|
| *H02K 11/215* | (2016.01) |
| *H02K 21/16* | (2006.01) |
| *H02K 29/08* | (2006.01) |

(52) U.S. Cl.
CPC ........... *H02K 11/215* (2016.01); *H02K 21/16* (2013.01); *H02K 29/08* (2013.01)

(58) Field of Classification Search
CPC ...... H02K 11/215; H02K 21/16; H02K 29/08; H02K 3/28; H02K 11/0015; H02K 1/274

(Continued)

(56) References Cited

U.S. PATENT DOCUMENTS

| | | | |
|---|---|---|---|
| 5,258,697 | A | 11/1993 | Ford et al. |
| 5,631,512 | A | 5/1997 | Kawabata et al. |

(Continued)

FOREIGN PATENT DOCUMENTS

| | | |
|---|---|---|
| CN | 103166349 A | 11/2017 |
| CN | 207490634 U | 6/2018 |

(Continued)

OTHER PUBLICATIONS

English Translation—Machine Generated of CN103166349B, "Rotor with Embedded Permanent Magnets for Power Transmission Chain in a Mobile Working Machine", published on Nov. 3, 2017.

(Continued)

*Primary Examiner* — Jose A Gonzalez Quinones
(74) *Attorney, Agent, or Firm* — SMART & BIGGAR LP

(57) ABSTRACT

Electric motors and methods of controlling electric motors are described herein. The electric motors include a mobile component having at least one permanent magnet coupled thereto and a stator spaced apart from the mobile component. The stator includes at least one stator pole having a ferromagnetic core and a coil wrapped around the ferromagnetic core. The ferromagnetic core is naturally attracted to the at least one permanent magnet. The motors also include a magnetic position control system configured to monitor a position of the at least one permanent magnet relative to the stator and controllably deliver an electric pulse to the coil of each stator pole to generate a repulsive magnetic flux on the ferromagnetic core to cancel an attraction force between the ferromagnetic core and the at least one permanent magnet to control movement of the mobile component.

10 Claims, 17 Drawing Sheets

Related U.S. Application Data

(60) Provisional application No. 63/015,566, filed on Apr. 25, 2020.

(58) Field of Classification Search
USPC ...................... 310/49.01, 49.44, 49.46, 68 B
See application file for complete search history.

(56)                    References Cited

U.S. PATENT DOCUMENTS

| | | | |
|---|---|---|---|
| 6,392,370 | B1 | 5/2002 | Bedini |
| 6,545,444 | B2 | 4/2003 | Bedini |
| 6,677,730 | B2 | 1/2004 | Bedini |
| 7,109,671 | B2 | 9/2006 | Bedini |
| 7,385,330 | B2 | 6/2008 | Trzynadlowski et al. |
| 7,608,967 | B2 | 10/2009 | Durham et al. |
| 8,058,758 | B2 | 11/2011 | Ries |
| 8,963,026 | B2 | 2/2015 | Kramer |
| 9,455,601 | B2 | 9/2016 | Kramer |
| 10,148,159 | B2 | 12/2018 | Kusakabe |
| 2001/0015582 | A1 | 8/2001 | Nakajima |
| 2002/0097013 | A1 | 7/2002 | Bedini |
| 2005/0040723 | A1 | 2/2005 | Asai et al. |
| 2006/0071563 | A1 | 4/2006 | Fujii |
| 2010/0019704 | A1 | 1/2010 | Ueda |
| 2010/0148612 | A1 | 6/2010 | Takemoto et al. |
| 2011/0285216 | A1 | 11/2011 | Kurronen |
| 2012/0169161 | A1 | 7/2012 | Woo |
| 2014/0042842 | A1 | 2/2014 | Tokoi et al. |
| 2014/0049128 | A1 | 2/2014 | Zang |
| 2014/0246958 | A1 | 9/2014 | Taniguchi |
| 2014/0354119 | A1* | 12/2014 | Shishido ............... H02P 29/662 |
| | | | 310/68 B |

FOREIGN PATENT DOCUMENTS

| | | |
|---|---|---|
| 2015/0061444 | A1 | 3/2015 | Kamiya et al. |
| 2018/0006541 | A1 | 1/2018 | Li et al. |
| 2019/0348891 | A1 | 11/2019 | Jahshan |
| 2020/0019123 | A1 | 1/2020 | Nobe |
| 2023/0042503 | A1 | 2/2023 | Bussières et al. |

| | | |
|---|---|---|
| EP | 1848092 | 9/2015 |
| EP | 2983288 | 10/2016 |
| EP | 2602911 B1 | 9/2018 |
| GB | 2282708 | 12/1995 |
| JP | 5001418 B2 | 8/2012 |
| WO | 9835425 A1 | 8/1998 |
| WO | 2007140624 | 12/2007 |
| WO | 2012071569 A2 | 5/2012 |
| WO | 2018037455 A1 | 3/2018 |
| WO | 2018072013 | 4/2018 |
| WO | 2020208037 | 10/2020 |
| WO | 2020237310 | 12/2020 |
| WO | 2021038451 | 3/2021 |

OTHER PUBLICATIONS

English Translation—Machine Generated of CN207490634U, "Power Unit of Multiple Track Magneto", published on Jun. 12, 2018.
English Translation—Machine Generated of WO2018037455A1, "Consequent Pole-Type Rotor, Electric Motor, and Air Conditioner", published on Mar. 1, 2018.
John K. Kim, Ph.D., "Novel Scheme of Driving Single Phase PM AC Motor in Uni-Direction," 2007 IEEE Power Electronics Specialists Conference, Orlando, FL, USA, Jun. 17-21, 2007, pp. 2255-2259.

* cited by examiner

Force – Repulsive Dynamic (FRD)

ELECTRIC MOTORS AND METHODS OF CONTROLLING THEREOF

CROSS-REFERENCE

This application is a continuation of U.S. Ser. No. 17/602,501 filed on Oct. 8, 2021, that is a 35 USC 371 national stage entry of PCT/CA2021/050568 filed on Apr. 26, 2021, and which claims priority to U.S. Provisional Application No. 63/015,566 entitled Electric Motors and Methods of Controlling Thereof filed Apr. 25, 2020. These documents are hereby incorporated herein by reference in their entirety.

FIELD

The embodiments disclosed herein relate to motors and methods of controlling motors, and more specifically to electric motors and methods of controlling electric motors.

BACKGROUND

Various types of electric machines have electric motors that include permanent magnets. Electric motors are conventionally used in applications including but not limited to heating, ventilation, and air conditioning (HVAC) systems, pumps and home appliances. Such permanent magnet motors conventionally include a stator and a rotor. The rotor conventionally includes a generally toroidal rotor core and a plurality of surface magnets mounted about a perimeter of the rotor's core.

Implementations of conventional electric motors featuring permanent magnets are limited by the current understanding of magnetism. Broadening the theoretical understanding of magnetism may provide for new and improved implementations of electric motors with permanent magnets. The need for more performant, efficient and versatile electrical motors is expanding with world global initiatives to reduce human environmental footprint, increase autonomy and flexibility. One example may be the electrification of various means of transportation and the digitalisation of various operations.

Accordingly, there is a need for new types of electric motors and methods of controlling electric motors.

SUMMARY

In accordance with a broad aspect, an electric motor is described herein. The electric motor comprises a mobile component having at least one permanent magnet coupled thereto, each permanent magnet having an external face having a surface area, and a stator spaced apart from the mobile component, the stator having at least one stator pole positioned to be opposed to the at least one permanent magnet. Each stator pole comprises a ferromagnetic core and a coil wrapped around the ferromagnetic core, the ferromagnetic core being naturally attracted to the at least one permanent magnet. The electric motor also includes a magnetic position control system configured to monitor a position of the at least one permanent magnet on the mobile component relative to the stator and, in response to the position of the at least one permanent magnet, controllably deliver an electric pulse to the coil of each at least one stator pole to generate a repulsive magnetic flux on the ferromagnetic core to cancel an attraction force between the ferromagnetic core and the at least one permanent magnet to control movement of the mobile component. A difference between the surface areas of the external face of each of the permanent magnets is less than 10%. A maximum distance between centerlines of two adjacent stator poles is two times a width of one of the permanent magnets. The external face of each permanent magnet of the mobile component has a same polarity.

In accordance with a broad aspect, an electric motor is described herein. The electric motor includes a rotor having at least one permanent magnet coupled thereto, each permanent magnet having an external face having a surface area, a shaft fixedly coupled to the rotor such that rotation of the rotor rotates the shaft, and a stator surrounding the rotor, the stator having at least one stator pole positioned to be opposed to the at least one permanent magnet, each stator pole comprising a ferromagnetic core and a coil wrapped around the ferromagnetic core, the ferromagnetic core being naturally attracted to the at least one permanent magnet. The electric motor also includes a magnetic position control system configured to monitor a position of the at least one permanent magnet on the rotor relative to the stator and, in response to the position of the at least one permanent magnet, controllably deliver an electric pulse to the coil of each at least one stator pole to generate a repulsive magnetic flux on the ferromagnetic core to cancel an attraction force between the ferromagnetic core and the at least one permanent magnet to control movement of the mobile component. A difference between the surface areas of the external face of each of the permanent magnets is less than 10%. A maximum distance between centerlines of two adjacent stator poles is two times a width of one of the permanent magnets. The external face of each permanent magnet of the mobile component has a same polarity.

In at least one embodiment, the difference between the surface areas of the external face of each of the permanent magnets is less than 5%.

In at least one embodiment, the difference between the surface areas of the external face of each of the permanent magnets is less than 3%.

In at least one embodiment, a difference between the surface area of the external face of any one of the permanent magnets and a surface area of an external face of any one of the stator poles is less than 10%.

In at least one embodiment, the difference between the surface area of the external face of any one of the permanent magnets and the surface area of the external face of any one of the stator poles is less than 5%.

In at least one embodiment, the difference between the surface area of the external face of any one of the permanent magnets and the surface area of the external face of any one of the stator poles is less than 3%.

In at least one embodiment, each of the permanent magnets has a cylindrical shape.

In at least one embodiment, each of the permanent magnets has a prism shape.

In at least one embodiment, the magnetic position control system monitors and manages a relative position of at least one permanent magnet based on magnetic flux of the at least one permanent magnet by delivering a modulated electric pulse to the at least one stator pole to control the motor and provide for the motor to operate in various operating modes.

In at least one embodiment, each ferromagnetic core of the stator is radially and/or axially spaced from each permanent magnet of the rotor by a gap.

In at least one embodiment, the motor includes one stator pole and one permanent magnet.

In at least one embodiment, the motor includes two or more permanent magnets.

In at least one embodiment, the motor includes two or more stator poles.

In at least one embodiment, the motor includes a number of stator poles in a range of 1 to 100.

In at least one embodiment, the motor includes a number of stator poles in a range of 10 to 75.

In at least one embodiment, the motor includes a number of stator poles in a range of 15 to 50.

In at least one embodiment, the motor includes a number of stator poles in a range of 15 to 30.

In at least one embodiment, the motor includes a number of stator poles in a range of 16 to 20.

In at least one embodiment, the motor includes a number of stator poles in a range of 1 to 100 per rotor stack.

In at least one embodiment, the motor includes a number of stator poles in a range of 10 to 75 per rotor stack.

In at least one embodiment, the motor includes a number of stator poles in a range of 15 to 50 per rotor stack.

In at least one embodiment, the motor includes a number of stator poles in a range of 15 to 30 per rotor stack.

In at least one embodiment, the motor includes a number of stator poles in a range of 16 to 20 per rotor stack.

In at least one embodiment, the stator poles are generally equally spaced around a periphery of the stator.

In at least one embodiment, the stator poles are generally equally spaced axially and parallel to the mobile components.

In at least one embodiment, the motor includes two or more stator poles interconnected in parallel, or in series, or in a mix of parallel and series, in one or more circuits, arranged around the rotor in one or more groups having a same polarity when energized together.

In at least one embodiment, the stator poles are generally equally spaced from each other around the stator.

In at least one embodiment, the mobile component has a diameter or length in a range of 1 inch to 200 inches.

In at least one embodiment, the mobile component has a diameter or length in a range of 1 inch to 60 inches.

In at least one embodiment, the mobile component has a diameter or length in a range of 6 inches to 36 inches.

In at least one embodiment, the rotor has a diameter in a range of 1 inch to 200 inches.

In at least one embodiment, the rotor has a diameter in a range of 1 inch to 60 inches.

In at least one embodiment, the rotor has a diameter in a range of 6 inches to 36 inches.

In at least one embodiment, the motor has a maximum rotational speed in a range of about 1 to 100,000 revolutions per minute (RPM).

In at least one embodiment, the motor has a maximum rotational speed in a range of about 1 to 50,000 revolutions per minute (RPM).

In at least one embodiment, the motor has a maximum rotational speed in a range of about 1 to 30,000 revolutions per minute (RPM).

In at least one embodiment, the permanent magnets are made of neodymium or any other magnet alloy.

In at least one embodiment, the ferromagnetic cores are made of ferromagnetic metals such as laminated silicon iron, soft iron or others.

In at least one embodiment, one or more electric pulses are applied for a fraction of a time of a full rotor turn.

In at least one embodiment, the electric pulse has a power input in a range to be equivalent or less than the FMD energy for a fraction of a time of a revolution.

In at least one embodiment, the magnetic position control system is configured to controllably deliver an electric pulse to the coil of the at least one stator pole to generate a repulsive magnetic flux on the ferromagnetic core to cancel and/or to repulse an attraction force between the ferromagnetic core and the permanent magnet to rotate the rotor when the at least one stator pole is aligned with the permanent magnet.

In at least one embodiment, the magnetic position control system is configured to stop controllably delivering a modulated electric pulse to the coil of the at least one stator pole to generate a repulsive magnetic flux on the ferromagnetic core to cancel and/or to repulse an attraction force between the ferromagnetic core and the permanent magnet to rotate the rotor when the at least one stator pole is positioned about 3 to about 20 degrees from rotor-to-pole alignment point.

In at least one embodiment, the magnetic position control system is further configured to, in response to the position of the at least one permanent magnet, controllably deliver an electric pulse to the coil of each at least one stator pole to generate a repulsive magnetic flux on the ferromagnetic core to generate a repulsive force between the ferromagnetic core and one of the permanent magnets.

In at least one embodiment, the magnetic position control system is further configured to, in response to the position of the at least one permanent magnet, controllably deliver an electric pulse to the coil of each at least one stator pole to generate a repulsive magnetic flux on the ferromagnetic core to reduce the attraction force between the ferromagnetic core and one of the permanent magnets to slow the movement of the mobile component.

In accordance with a broad aspect, a method of controlling an electric motor is described herein, the electric motor having a stator having at least one independent pole or pole circuit generally equally spaced along the stator, the independent pole or pole circuit being alternating around a periphery of the stator. The method includes initiating movement of a mobile component of the electric motor by controllably delivering a first modulated electric pulse to an electric coil surrounding a ferromagnetic core of a first stator pole of the stator when the ferromagnetic core is opposed to and magnetically attracted to a permanent magnet coupled to the mobile component of the electric motor. The method also includes, as the permanent magnet rotates away from the first stator pole towards a second stator pole of the electric motor, the permanent magnet being attracted by a ferromagnetic pole of the second stator pole, controllably delivering a second modulated electric pulse to the ferromagnetic core of the second stator pole when the permanent magnet reaches the second stator pole to generate a repulsive magnetic flux of the ferromagnetic core of the second stator pole to cancel an attraction force between the permanent magnet and the ferromagnetic core of the second stator pole.

In at least one embodiment, after initiating movement of the mobile component by controllably delivering a first modulated electric pulse to an electric coil surrounding a ferromagnetic core of a first stator pole, the method includes controllably delivering one or more subsequent modulated electric pulses to the electric coil surrounding the ferromagnetic core of the first stator pole to generate a repulsive magnetic flux of the ferromagnetic core of the first stator pole to promote movement of the permanent magnet away from the first stator pole.

In accordance with a broad aspect, a method of controlling an electric motor having a stator having at least one independent pole or pole circuit of stator poles generally equally spaced along the stator is described herein, the independent poles or pole circuits alternating around a periphery of the stator. The method includes initiating rotation of the electric motor by applying an external torque or force to the rotor and/or shaft and, as a permanent magnet of the rotor rotates away from a first stator pole towards a second stator pole of the electric motor, the permanent magnet being attracted by a ferromagnetic pole of the second stator pole, controllably delivering a second modulated electric pulse to the ferromagnetic core of the second stator pole to generate a repulsive magnetic flux of the ferromagnetic core of the second stator pole to cancel an attraction force between the permanent magnet and the ferromagnetic core of the second stator pole.

In at least one embodiment, as the permanent magnet rotates away from the second stator pole towards a third stator pole, the method includes controllably delivering a modulated electric pulse to the ferromagnetic core of the second stator pole to generate a repulsive magnetic flux of the ferromagnetic core of the second stator pole to generate a repulsion force between the permanent magnet and the second stator pole to push the permanent magnet towards the third stator pole.

In at least one embodiment, as the permanent magnet rotates away from the second stator pole towards a third stator pole, the permanent magnet being attracted by a ferromagnetic pole of the third stator pole, the method includes controllably delivering a third modulated electric pulse to the ferromagnetic core of the third stator pole when the permanent magnet reaches the third stator pole to generate a repulsive magnetic flux of the ferromagnetic core of the third stator pole to cancel an attraction force between the permanent magnet and the ferromagnetic core of the third stator pole.

In accordance with a broad aspect, a method of controlling an electric motor having a stator having at least one independent pole or pole circuit of stator poles generally equally spaced along the stator is described herein, the at least one independent pole or pole circuit alternating around a periphery of the stator. The method includes, when each permanent magnet of the rotor is aligned with a ferromagnetic core of a respective stator pole of the stator, each stator pole having an electric coil surrounding the ferromagnetic core, initiating rotation of the rotor by controllably delivering a first modulated electric pulse to the electric coil of each stator pole. The method also includes, when each respective permanent magnet of the rotor is positioned between its respective stator pole and a respective adjacent stator pole, de-energizing each of the electric coils of each stator pole and, as each respective permanent magnet of the rotor reaches an adjacent stator pole, controllably delivering a second modulated electric pulse to the electric coil of each adjacent stator pole to generate a repulsive magnetic flux of the ferromagnetic core to cancel an attraction force between each respective permanent magnet and the ferromagnetic core of its respective adjacent stator pole.

In accordance with a broad aspect, an electric motor is described herein. The electric motor comprises a mobile component having at least one permanent magnet coupled thereto, each permanent magnet having an external face having a surface area, and a stator spaced apart from the mobile component, the stator having at least one stator pole positioned to be opposed to the at least one permanent magnet. Each stator pole comprises a ferromagnetic core and a coil wrapped around the ferromagnetic core, the ferromagnetic core being naturally attracted to the at least one permanent magnet. The electric motor also includes a magnetic position control system configured to monitor a position of the at least one permanent magnet on the mobile component relative to the stator and, in response to the position of the at least one permanent magnet, controllably deliver an electric pulse to the coil of each at least one stator pole to generate a repulsive magnetic flux on the ferromagnetic core to cancel an attraction force between the ferromagnetic core and the at least one permanent magnet to control movement of the mobile component.

In accordance with a broad aspect, an electric motor is described herein. The electric motor includes a rotor having at least one permanent magnet coupled thereto, each permanent magnet having an external face having a surface area, a shaft fixedly coupled to the rotor such that rotation of the rotor rotates the shaft, and a stator surrounding the rotor, the stator having at least one stator pole positioned to be opposed to the at least one permanent magnet, each stator pole comprising a ferromagnetic core and a coil wrapped around the ferromagnetic core, the ferromagnetic core being naturally attracted to the at least one permanent magnet. The electric motor also includes a magnetic position control system configured to monitor a position of the at least one permanent magnet on the rotor relative to the stator and, in response to the position of the at least one permanent magnet, controllably deliver an electric pulse to the coil of each at least one stator pole to generate a repulsive magnetic flux on the ferromagnetic core to cancel an attraction force between the ferromagnetic core and the at least one permanent magnet to control movement of the mobile component.

These and other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 3A is a top view of the rotor, the permanent magnet and the stator pole of FIG. 1A at the first angular position (at alignment (0 degree) or at rest), according to one embodiment.

FIG. 3B is a graph showing the change in torque for a changing angular position of the rotor of the electric motor shown in FIG. 3A showing the Force-Repulsive Dynamic (FRD) as described herein.

Figure 1B:
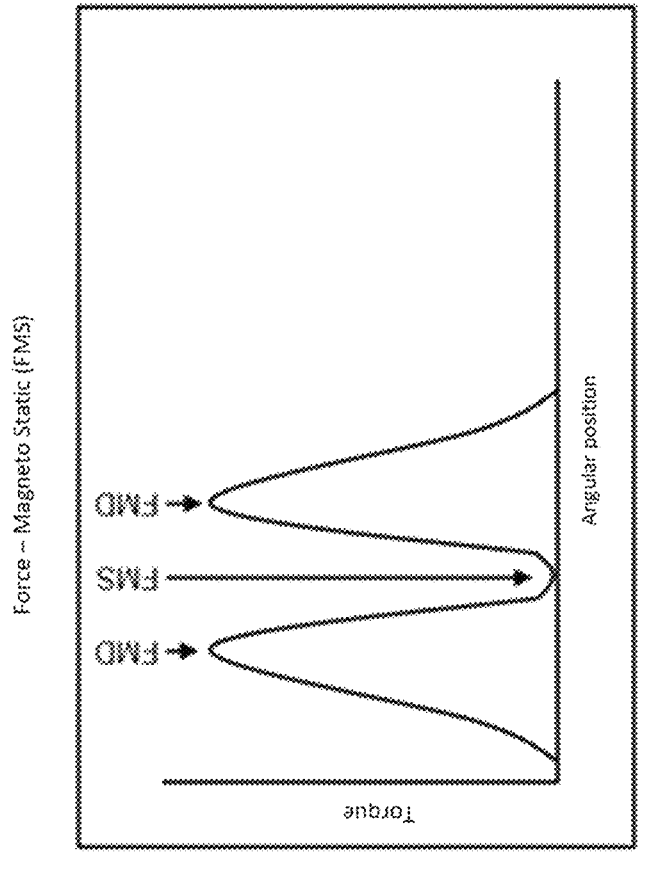
FIG. 1B is a graph showing the change in torque for a changing angular position of the rotor of the electric motor shown in FIG. 1A showing the Force-Magneto Static (FMS) as described herein.

Further aspects and features of the example embodiments described herein will appear from the following description taken together with the accompanying drawings.

DETAILED DESCRIPTION

Various devices and methods are described below to provide an example of at least one embodiment of the claimed subject matter. No embodiment described below limits any claimed subject matter and any claimed subject matter may cover devices and methods that differ from those described below. The claimed subject matter is not limited to devices and methods having all of the features of any one device or method described below or to features common to multiple or all of the devices and methods described below. It is possible that a device or method described below is not an embodiment of any claimed subject matter. Any subject matter that is disclosed in a device or method described herein that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as "substantially", "about" and "approximately" as used herein mean a reasonable amount of deviation of the modified term such that the end result is not significantly changed. These terms of degree should be construed as including a deviation of the modified term, such as a deviation of at least ±5% or at least ±10%, for example, if this deviation does not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made, such as 1%, 2%, 5%, or 10%, for example, if the end result is not significantly changed.

It should also be noted that, as used herein, the wording "and/or" is intended to represent an inclusive – or. That is, "X and/or Y" is intended to mean X or Y or both, for example. As a further example, "X, Y, and/or Z" is intended to mean X or Y or Z or any combination thereof.

The following description is not intended to limit or define any claimed or as yet unclaimed subject matter. Subject matter that may be claimed may reside in any combination or sub-combination of the elements or process steps disclosed in any part of this document including its claims and figures. Accordingly, it will be appreciated by a person skilled in the art that an apparatus, system or method disclosed in accordance with the teachings herein may embody any one or more of the features contained herein and that the features may be used in any particular combination or sub-combination that is physically feasible and realizable for its intended purpose.

Recently, there has been a growing interest in developing electric motors with permanent magnets. The electric motors described herein may be electrodynamic motors that include one or more permanent magnets and a rotor interacting with salient stator poles. In a traditional electric motor, a rotor (i.e. a rotating part) spins inside a stator (i.e. static part). In a linear motor, the stator is unwrapped and laid out flat and the rotor moves past it in a straight line. Accordingly, the term "rotor" herein may include or refer to any mobile or rotating part, including but not limited to a part that travels in a straight line. Herein, both traditional electric motors and linear motors are described.

In some embodiments, movement (e.g. rotation) of the rotor may be initiated and sustained primarily by the one or more permanent magnets being coupled to the rotor being attracted to solid iron cores of electromagnets positioned on or around the stator poles. In some embodiments, electrical current pulses applied to the stator electromagnets are sufficient to cancel any backward drag of the permanent magnets of the rotor as soon as the permanent magnets of the rotor pass the electromagnet cores of the stator, thereby allowing continuous motion (e.g. rotation) of the rotor.

In some embodiments, the electric motors described herein generally relate to a form of electric motor that can generate mechanical drive torque, or linear force depending on the configuration selected, with high efficiency (possibility of positive gain) in relation to the electrical power input to the electric motor.

Other key characteristics of some of the embodiments of electric motors described herein may include, but are not limited to: self starting, speed controlled, can operate on-demand CW or CCW, overload protected, minimal heat generation, modular construction, constant hi-torque/force, dynamic braking.

In some embodiments, the electric motors described herein generally include to a switched magnetic flux pulse motor and its control, meaning machines operated by virtue and attributes of the mutual magnetic attraction and/or repulsion as between magnetized poles.

It should be understood that the following description and examples include some basic principles that provide for the electric motors described herein to operate as well as the various principles discovered and quantified while the electric motors described herein are operating. In some embodiments, the electric motors described herein may include one or more of the following states or functions:

Force-Magneto Static (FMS)
Force-Magneto Dynamic (FMD)
Force-Repulsive Dynamic (FRD)
Brake Mode
MPF Operation Mode
Dynamic Operation Mode
Magnetic Position Control System (MPCS)

Each of these states or functions is described in greater detail below.

It should be understood that in the following description, the reference numeral 100 refers to an electric motor including a permanent magnet (sometimes referred to as Element "A"), an electromagnet (sometimes referred to as Element "B") and a rotor (sometimes referred to as Element "C"). It should be understood that although the following description describes electric motors in one or more rotary motor variants, the same principles described herein may be applied to other embodiments, such as but not limited to linear motors and to wheel hub motor variants.

The term "Force-Magneto Static" (FMS) as used herein refers to a force that does not result in any angular movement of the rotor 106 of the electric motor 100. More specifically, as shown in FIG. 1A, FMS refers to an attraction force (as indicated with arrow 110 in FIG. 1A) between permanent magnet 102 and ferromagnetic pole 104 that is directed towards the ferromagnetic pole 104, is perpendicular to the axis of rotation of the rotor 106 and intersects the axis of rotation of the rotor 106. It should be noted that the axis of rotation of the rotor 106 passes directly through the centre 107 of the rotor 106. Because the FMS intersects the axis of rotation of the rotor 106, no torque is generated. The FMS may be compared to electromotive forces found in typical induction motors. However, in this case, the FMS is not derived from an inductor but rather is derived from a magnetic field of the permanent magnet 102. The FMS can be quantified as a function of the strength of permanent magnet 102, the distance of gap 112 between the permanent magnet 102, the ferromagnetic pole 104, and the ferromagnetic alloy itself.

Figure 1A:
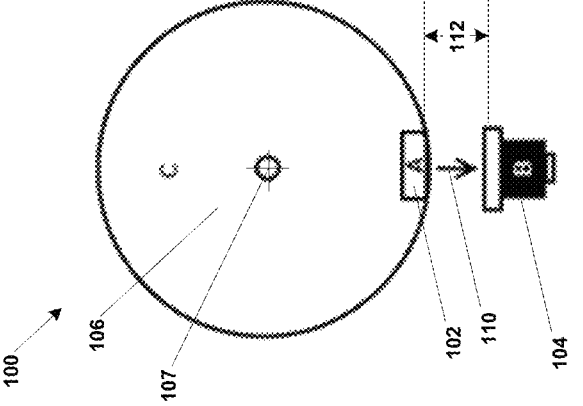
FIG. 1A is a top view of a rotor, a permanent magnet and an electromagnet of an electric motor at a first angular position (at alignment (0 degree) or at rest), according to one embodiment.

FIG. 1B shows a graph of torque versus angular position of the motor 100 of FIG. 1A showing that FMS does not generate any torque.

Figures 2A, 2B:
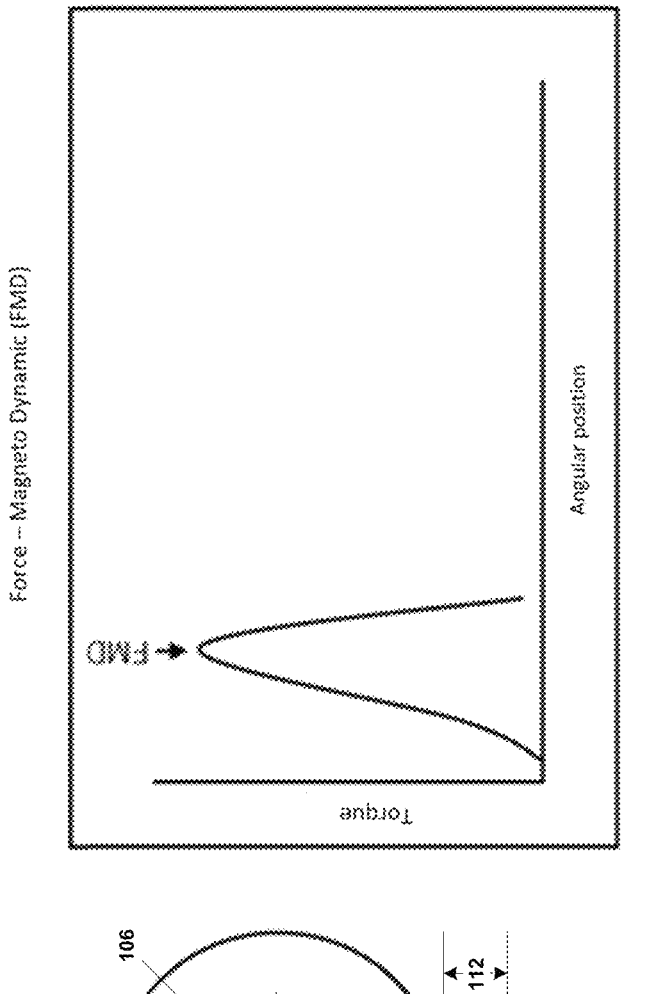
FIG. 2A is a top view of the rotor, the permanent magnet and the stator pole of the electric motor of FIG. 1A at a second angular position, according to one embodiment. In the position shown, the magnet will be attracted to the adjacent ferromagnetic pole.
FIG. 2B is a graph showing the change in torque for a changing angular position of the rotor of the electric motor shown in FIG. 2A showing the Force-Magneto Dynamic (FMD) as described herein. In the position shown, the magnet will be attracted to the adjacent ferromagnetic pole.

The term Force-Magneto Dynamic (FMD) as used herein refers to a force that creates angular movement of the rotor 106 in the electric motor 100. More specifically, as shown in FIG. 2A, the FMD refers to an attraction force resulting in rotation, as indicated with arrow 110 in FIG. 2A, between permanent magnet 102 and ferromagnetic pole 104. The FMD is directed towards the ferromagnetic pole 104 and is perpendicular to but offset from (e.g. laterally spaced apart from) the axis of rotation of the rotor 106, thus generating a resulting torque. The generated torque may be useful free energy from magnetic fields relative motion and natural magnetic attraction/repulsion effects of permanent magnets. The FMD is available inherent to the usage of permanent magnets (such as permanent magnet 102) and does not require any external energy input. The FMD can be quantified as a function of, or related to, the strength of permanent magnet 102, the lateral distance 114 between the permanent magnet 102 and the ferromagnetic pole 104, the shape of the magnets (i.e. one or both of permanent magnet 102 and ferromagnetic port 104) and the ferromagnetic alloy itself.

FIG. 2B shows a graph of torque versus angular position of the motor 100 of FIG. 2A showing that FMD generates torque.

Figures 3A, 3B:
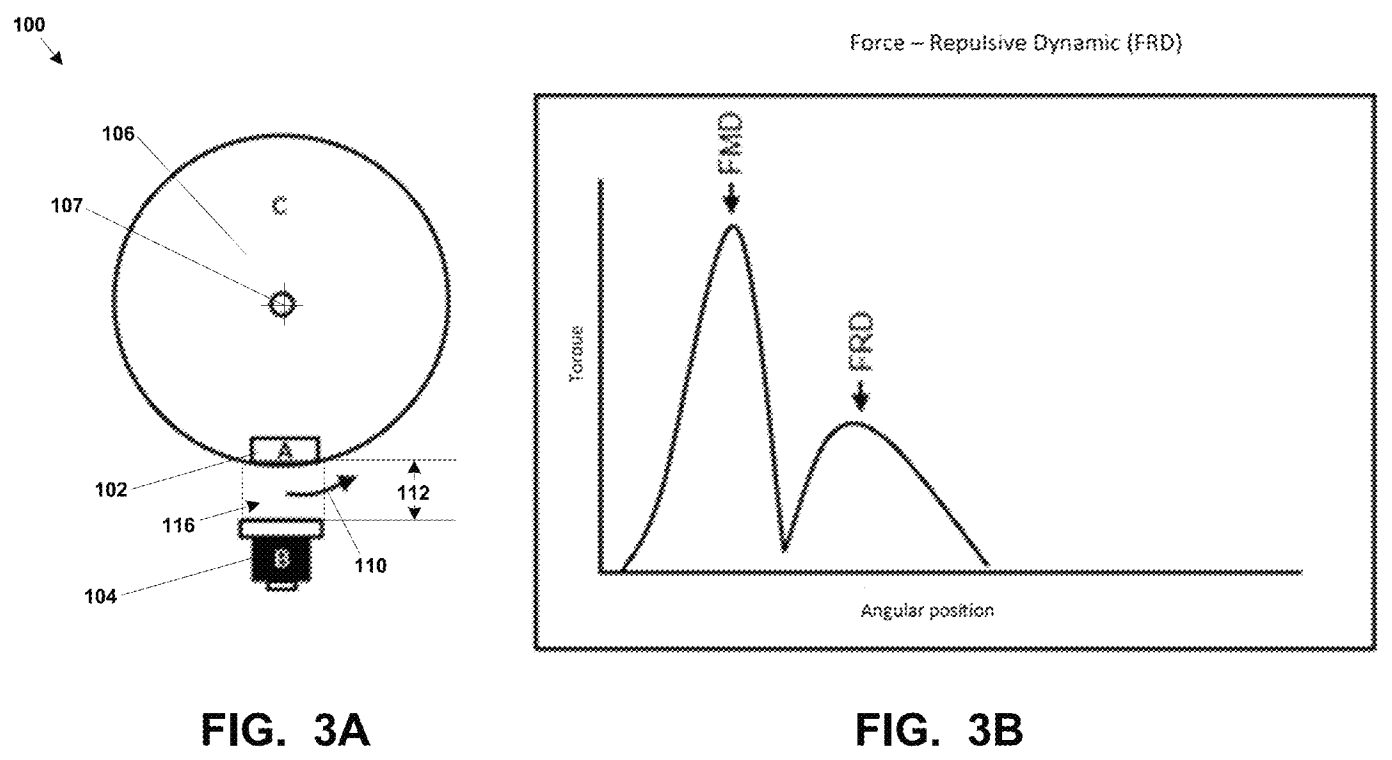

The term Force-Repulsive Dynamic (FRD) as used herein refers to another force that creates angular movement of the rotor 106 in the electric motor 100 (FIG. 3A). More specifically, the FRD requires, in addition, an external energy input. As shown in FIG. 3A, the FRD can be referred to as the resultant of a repulsive magnetic field created at the ferromagnetic pole 104 by the permanent magnet 102 when the permanent magnet 102 passes through the FMD zone after the brake point 116. This magnetic field can be modulated to have a more or less pronounced effect on the rotor 106. The energy demand of electric motor 100 while operating can be considered to be proportional to a selected FRD intensity. The time-lapse this force is applied is relatively short in the electric motors described herein during a rotation cycle. For the example, in some embodiments, the pulse is applied within approximately 3 to 20 degrees of rotation, thus faster the rotor turns, shorter the pulse is. The intensity of the FRD is low to null while operating in MPF Operation Mode. However, it is more intensively used while operating in Dynamic Operation Mode. The FRD can be quantified as a function of the strength of the permanent magnet 102, the strength of the magnetic field developed by the electromagnet 104, the time-lapse the FRD is applied, the distance of gap 112 between the permanent magnet 102 and the ferromagnetic pole 104, and the ferromagnetic alloy itself.

FIG. 3B shows a graph of torque versus angular position of the motor 100 of FIG. 3A showing that FRD generates torque.

Figures 4A, 4B:
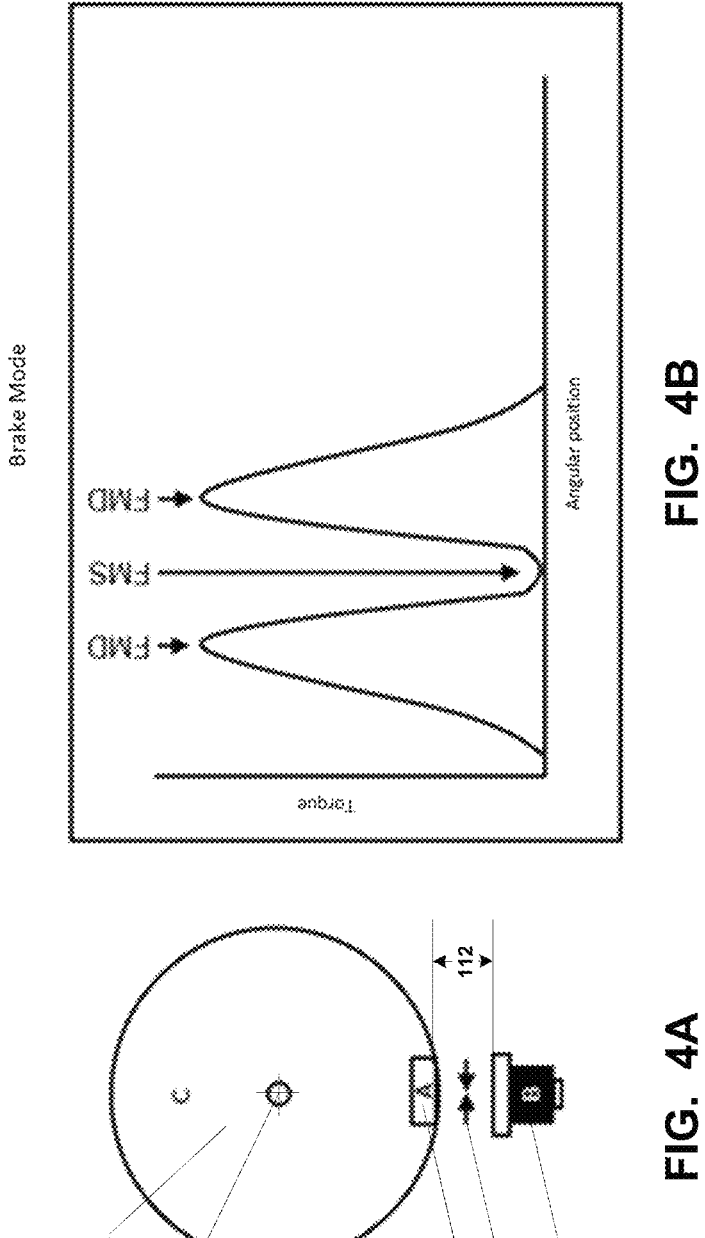
FIG. 4A is a top view of the rotor, the permanent magnet and the stator pole of FIG. 1A at the first angular position (at alignment (0 degree) or at rest), according to one embodiment.
FIG. 4B is a graph showing the change in torque for a changing angular position of the rotor of the electric motor shown in FIG. 4A showing the Brake Mode as described herein.

The term Brake Mode as used herein refers to a mode of operation of the electric motor 100 where there is no external electrical energy input (i.e. no current nor voltage) applied to the electric motor 100. In this mode, as shown in FIG. 4A, the permanent magnet 102 self-aligns with the ferromagnetic core of the electromagnet 104. Since the distance of gap 112 between permanent magnet 102 and electromagnet 104 is at its minimum point (e.g. permanent magnet 102 and electromagnet 104 are directly opposed to one another), the FMS is maximum and inhibits rotation of rotor 106. Any angular misalignments, on either side, between the permanent magnet 102, the electromagnet ferromagnetic core 104 and the rotation axis of the rotor 106 are bounded by FMD that generates counteracting torque to naturally center the permanent magnet 102, the electromagnet ferromagnetic core 104 and the rotor 106 around maximum FMS.

In MPF Operation Mode, when no external electrical energy inputs are applied to the electric motor 100 (i.e. no current and no voltage) and when the permanent magnet 102 is not aligned with the electromagnet ferromagnetic core 104, the FMD generates a torque (as shown in FIG. 2A) on the rotor 106 and forces the rotor 106 to rotate and re-align towards maximum FMS (also referred to as the "Brake Point").

Figures 5A, 5B:
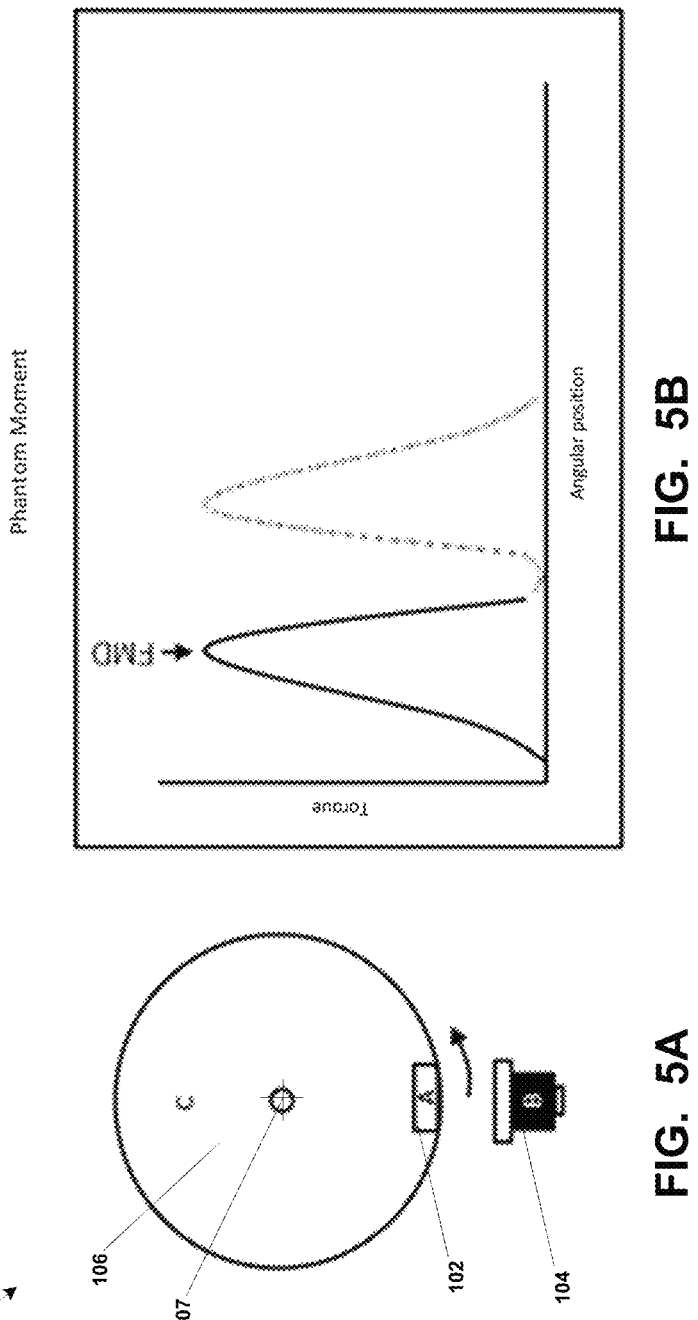
FIG. 5A is a top view of the rotor, the permanent magnet and the stator pole of FIG. 1A at the first angular position, according to one embodiment.
FIG. 5B is a graph showing the change in torque for a changing angular position of the rotor of the electric motor shown in FIG. 4A showing the Phantom Moment as described herein.

At this stage, having just arrived at the Brake Point, the rotor 106 is about to face a counteracting FMD torque just as strong and enough to brake the rotor 106. At this point, the Magnetic Position Control System (MPCS; described below), using minimal external electrical energy inputs, injects an electromagnetic pulse via a ferromagnetic core of the stator pole 104. The electromagnetic pulse has a repulsing effect on the permanent magnet 102 equivalent to the attraction force between the permanent magnet 102 and the ferromagnetic core of the stator pole 104. The electromagnetic pulse is applied for a period of time that is long enough to ensure the permanent magnet 102 gets outside the FMD influence zone that could slow it down (see FIGS. 5A and 5B). As a result, the counteracting FMD torque is annealed momentarily, which makes the stator pole 104 invisible to the flux of the permanent magnet 102, allowing the rotor 106 to freely rotate beyond the "Brake Point" and until it reaches its next attraction zone of a ferromagnetic pole of a neighboring (or adjacent) stator pole 104. The moment where the stator pole 104 becomes unaffected by the magnetic flux of permanent magnet 102 can be referred to as a "Phantom Moment".

In Dynamic Operation Mode, similar to the MPF Operation Mode described above, where no external electrical energy inputs are applied for electric motors described herein (i.e. no current nor voltage), when the permanent magnet 102 is not aligned with the electromagnet ferromagnetic core of a stator pole 104, FMD generates a torque, according to FIGS. 2A and 2B, on the rotor 106 forcing it to naturally rotate and re-align towards maximum FMS also called "Brake Point" (FIGS. 4A and 4B).

At this stage, after having just arrived at the "Brake Point", the rotor 106 is about to face a counteracting FMD torque just as strong and enough to brake the rotor 106. At this point, the MPCS, using minimal, external electrical energy inputs, injects via the ferromagnetic core of the stator pole 104 an electromagnetic pulse having a repulsing effect on the permanent magnet 102 greater than the attraction force between the permanent magnet 102 and the ferromagnetic core of the stator pole 104. The electromagnetic pulse is applied long enough to ensure the permanent magnet 102 gets outside the FMD influence zone but this time adding up an additional repulsion torque (due to FRD) that favors the rotation (see FIGS. 3A and 3B). As a result, the counteracting FMD is not only annealed momentarily but the rotor 106 is pushed by FRD with an increased torque towards its next ferromagnetic pole attraction zone, in addition of the magnet being attracted naturally by the next adjacent ferromagnetic pole.

The MPCS is a system that monitors and controls the various magnetic fluxes in the electric motors described herein. The MPCS is interacting continuously with the ferromagnetic core of the stator pole 104 to modulate the magnetic pulses function of the various operating modes, such as, but not limited to, the operating modes described above and/or the power demand on the motors described herein. This system may provide for control of various options and controls the execution of each step for each component interacting together in the electric motors described herein. The MPCS contains mechanical, electronic and software components. The electric motors described herein may include one or more MPCS to operate. Components This following section describes the various components found in the electric motors described herein. As noted below, the various components can be used in several different configurations. Regardless of the combination of components selected for each electric motor, each of the electric motors described herein will follow the principles described in this document.

Figure 6:
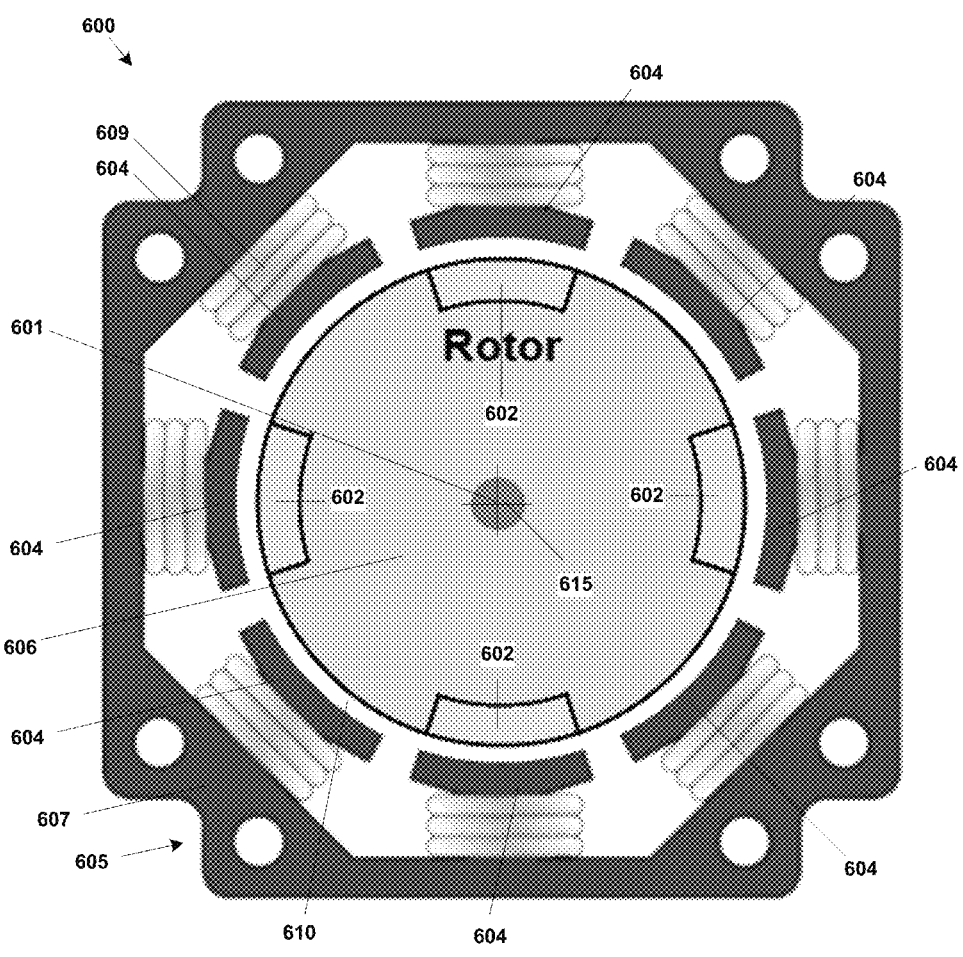
FIG. 6 is a top view of an electric motor, according to one embodiment.

Referring to FIG. 6, illustrated therein is an electric motor 600 according to at least one embodiment. Electric motor 600 includes a rotor 606. Rotor 606 includes all of the mobile components of the electric motor 600. Generally, rotor 606 transposes rotational dynamic and static magnetic forces into mechanical torque through a shaft 601 (see FIG. 7) of the motor 600.

Rotor 606 includes one or more permanent magnets 602 that provide for the rotor 606 to rotate about an axis of the shaft 601. The number of permanent magnets 602 of motor 600 can be an odd number or an even number. Further, the permanent magnets 602 could be made from various forms, shapes or alloys. For example, in the electric motor 600 shown FIG. 6, a set of four permanent magnets 602 are evenly distributed around shaft 601 and are fixedly coupled to the rotor 606.

Stator 605 comprises all of the fixed components of the electric motor 600. For instance, in some embodiments, stator 605 includes all of the parts forming an entirely self-contained motor unit that could be anchored and installed for whatever application the electric motor 600 is intended.

Stator 605 has a frame 607 for containing the components of the stator 605. Stator 605 serves as a support for each of the stator poles 604 and their respective winding 609 that, in combination with permanent magnets 602 of the rotor 606, generate the rotary motion of the electric motor 600. The number of stator poles 604 of the stator 605 can be in a range of about 1 to about 100, or about 10 to about 75, or about 15 to about 50, or about 15 to about 30, or about 16 to about 20, or about 1 to about 25, or about 10 to about 25, or about 15 to about 20, or about 16 to about 18. In at least one embodiment, the rotor 606 may have more than one rotor stack. For example, the motor 600 can comprise 1 to 20 stacks, 1 to 12 stacks, 1 to 10, 1 to 8, 1 to 6, 1 to 5, 1 to 4, 1 to 3 or 1 to 2 stacks. In at least one embodiment, the number of stator poles 604 of the stator 605 can be in a range of about 1 to about 100 per rotor stack, or about 10 to about 75 per rotor stack, or about 15 to about 50 per rotor stack, or about 15 to 30 per rotor stack, or about 16 to about 20 per rotor stack.

It should be noted that, in embodiments with more than one stator pole 604, the stator poles do not need to be evenly paired with a respective permanent magnet 602 of the rotor 606. Further, the stator poles 604 are generally equally spaced apart from one another around the shaft 601. Stator poles 604 may be made from various forms, shapes, coil wires or core alloy(s). For the example, in some embodiments, electric motor 600 may include a set of eight stator poles 604 evenly distributed (i.e. spaced) around the shaft 601 and fixed to the stator 605 through the back iron 607.

Selection of various features of the components of the rotor 606 and the stator 605, such as but not limited to the position of the stator poles 604 relative to each other and relative to the position of the permanent magnets 602, and the position of the permanent magnets 602 relative to each other and relative to the position of the stator poles 604, may accentuate specific performance characteristics and functionalities of the electric motor 600.

Rotor 606 is generally made from a material strong enough to retain structural integrity of all the rotative components of electric motor 600 subjected to magnetic, centrifugal, gravitational, vibratory and thermal expansion forces. Rotor 606 may be made from ferromagnetic materials or may be made from non-ferromagnetic materials, provided that if the rotor 606 is made from a ferromagnetic material the ferromagnetic material does not obstruct a magnetic field of the permanent magnets 602. In some embodiments, the rotor 606 may be made from a material that magnifies the magnetic field of the permanent magnets 602. For instance, in some embodiments, the rotor 606 may be made from an alloy of copper and zinc (e.g. brass). In some embodiments, rotor 606 may have a conventional cylindrical-type shape.

Shaft 601 can be made from the any material typically used for making shafts found in conventional electric motors. Shaft 601 passes through a centre of the rotor 606 and is fixedly coupled thereto such at rotation of the rotor 606 provides for rotation of the shaft 601.

Permanent magnets 602 may be made from different alloys and may have various shapes and/or thicknesses, provided that each of the permanent magnets 602 has the same shape and thickness. As noted above, the electric motors described herein may include one or more permanent magnets 602, in odd or even numbers.

In some embodiments, a shape of an external face 611 of each of the permanent magnets 602 (as shown on FIG. 8) corresponds to (e.g. mirrors or provides equal spacing with) an external face 613 of each of the stator poles 604. Stator poles 604 or generally spaced apart from the permanent magnets 602 by a distance that is generally equal around the stator 602.

In some embodiments, a maximum angular distance between two adjacent centerlines (i.e. an axis extending through a centre thereof that is transverse, or perpendicular, to the axis of rotor 601) of stator poles 604 is about two times, or two times, the width, or diameter, of each of the permanent magnets 602.

In some embodiments, the polarity of each of the permanent magnets 602 at a portion of the magnet that is facing the stator poles 604 is the same for each of the permanent magnets 602 of the rotor 606.

Permanent magnets 602 each have an external face 611 having a surface area corresponding to a surface area of the magnet that is exposed to (i.e. opposed to) the one or more stator poles. Put another way, the surface area of external face 611 is the area of a portion of the permanent magnet through which the permanent magnet exerts a magnetic influence on the stator poles. In some embodiments, a difference between the surface area of the external face 611 of each of the permanent magnets 602 is less than about 10%, or less than about 5%, or less than about 3%.

Similarly, each of the stator poles 604 has an external face 613 having a surface area. The surface area of the external face 613 of each stator pole 604 is the area of a portion of the stator pole through which the stator pole is influenced magnetically by the permanent magnets 602. In at least one embodiment, a difference between the surface area of the external face 613 of each of the stator poles 604 and the surface area of the external face 611 of each of the permanent magnets 302 is less than about 10%, or less than about 5%, or less than about 3%.

Each of the permanent magnets 602 has a width. A size and shape of the magnets 602 can vary from one motor construction to another to obtain specific attributes. In at least one embodiment, the permanent magnets 602 have a cylindrical shape. In this case, in at least one embodiment, the magnets 602 width is equal to their diameter. The size and shape of the permanent magnets 602 (e.g. their width) and/or the spacing of the permanent magnets 602 and/or the spacing of the stator poles 604 may influence the torque capacity of the motor 600. In at least one embodiment, a maximum distance between centerlines of two adjacent stator poles 604 is two times a width of one of the permanent magnets 602.

In some embodiments, each permanent magnet 602 has a same polarity facing each stator pole 604.

Figure 7:
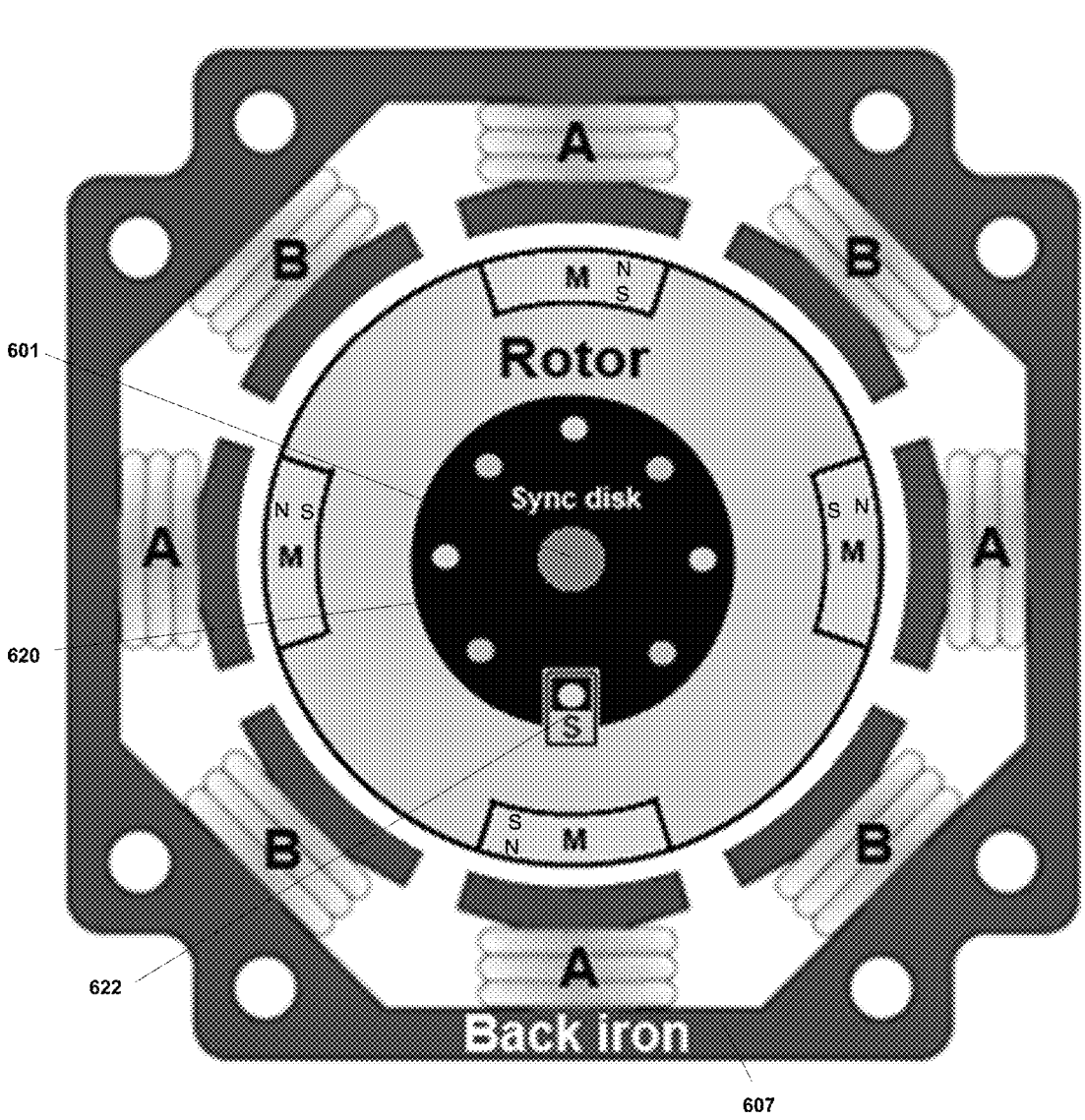
FIG. 7 is a top view of the electric motor of FIG. 6, showing the sync disk and sensor.

As shown on FIG. 7, the electric motor 600 may include a synchronization or index disk 620. Disk 620 is a component that works alongside a sensor 622. Both disk 620 and sensor 622 are part of a Magnetic Position Control System (MPCS) 624 of the electric motor 600.

It should be noted that disk 620 is an optional feature of the electric motors described herein. Although electric motor 600 includes a disk 620, it is not required.

Electric motor 600 includes a disk 620 having suite of eight small disk permanent magnets 626 evenly distributed around the disk 620. The disk permanent magnets 626 have the following polarity: N-S-N-S-N-S-N-S. The function of disk 620 is to index at all times the position of the rotor 606 towards the stator 605 to the MPCS 624.

It should be noted that although the MPCS 624 is represented in the drawings by disk 620 and sensor 622, MPCS 624 is a complete system that provides for locating different magnetic fluxes in the electric motor 600. MPCS 624 modulates the actions and signals sent to the stator poles 604 according to the operation modes selected (as described above) and the loading of the electric motor 600. In this manner, MPCS 624 may be thought of as acting as a "brain"

of the electric motor 600, by controlling, based on selected options, the execution of each step for every active component to perform its intended function in electric motor 600. MPCS 624 includes mechanical, electronic and software components. MPCS 624 can be unique (e.g. singular) or there can be more than one MPCS 624 in motor 600. Further, MPCS 624 may be positioned inside or outside the electric motor 600.

Each stator pole 604 includes a coil 609 wrapped around a ferromagnetic metal core 608.

Coil 609 may be of copper or aluminum wires (or any other conductive material) sized to withstand the amperage of the circuit. In addition, in some embodiments, coil 609 includes enough turns to withstand the voltage received, whilst achieving enough magnetic flux to repel the permanent magnets 602 at a specific time and for a given duration.

Core 608 is composed of a ferromagnetic substance and, generally, has a same shape as the permanent magnets 602 (i.e. the external face 613 of the core 608 is generally a corresponding shape to the shape of external face 611 of each permanent magnet 602). External face 611 of each permanent magnet 602 is generally opposed to the external face 613 of the cores 608 as the rotor 606 rotates. Each permanent magnet 602 is arranged on the rotor 606 such that the external face 611 of each permanent magnet 602 has a same polarity.

Each stator pole 604 has a direct influence on the attributes and performances of the electric motor 600. For instance, the stator poles 604 may be interconnected in parallel, in series, in a single and/or more circuit (also referred as asymmetrical and symmetrical design configurations). In some embodiments, electric motor 600 can be constructed around a single stator pole 604 or may include an infinite number of stator poles 604 (i.e. the number of stator poles is only limited by physical constraints). As noted above, the number of stator poles 604 in each electric motor embodiment described herein does not need to by the same as the number of permanent magnets 602 found on the rotor 606.

When the stator poles 604 are not energized, permanent magnets 602 are naturally attracted to the ferromagnetic material of each core 608. When the stator poles 604 are energized, the stator poles 604 have a natural repulsion to the permanent magnets 602, a degree of the repulsion being controllable based on the operation mode selected (e.g. MPF or Dynamic).

In the example shown in FIGS. 6 and 7, stator poles 604 are brought together under two groups: Group A and Group B connected in series, which can also be referred to as an asymmetrical design configuration. In one embodiment, each stator pole 604 is controlled by the MPCS and is made of laminated silicon iron.

The back-iron, or frame, 607 is an optional component of stator 605. back-iron 607 forms part of the laminated iron, for example, that surrounds the stator poles 604 of the stator 605. Mechanically, the back-iron 607 keeps the stator poles 604 in place while providing for the stator 605 to be connected to a motor frame, for example. Magnetically, the back-iron 607 provides for generating magnetic circuits between the stator poles 604. This provides for unenergized stator poles 604 to have a positive influence on the operation of electric motor 600. Moreover, the back-iron 607 can bring together stator poles 604 of a whole (e.g. A and B) or intermix together (e.g. A1 and B1 with A2 and B2). This may provide for stacking of circuit groups to each other, thus increasing the total power of the electric motor 600.

Depending on the features and configuration chosen, the back-iron 607 is an optional feature. It should be noted that the ability to stack stator poles 604 and rotor sets is a key characteristic of the electric motor 600, regardless of the presence of a back-iron 607. In at least one embodiment, motors with 1, 2, 4, 8 and 18 poles can be formed in a single rotor stack. In at least one embodiment, motors with up to about 100 poles can be formed in a single rotor stack. In at least one embodiment, motors with up 100 poles can be formed in a single rotor stack. In at least one embodiment, motors with more than one motor stack (i.e. multiple disks and magnets connected to the shaft axially) can be formed. In these embodiments, each rotor stack may include up to about 100 poles.

Gap 610 is the spacing between external face 611 of each of the permeant magnets 602 (as shown on FIG. 6) and external face 613 of each of the stator poles 604 (e.g. cores 608).

Step-By-Step Operation

The electric motors described herein are versatile and can have a variety of structures, as noted above. Regardless of the structure, the electric motors described herein generally follow the principles stated below.

The electric motors described herein are fundamentally DC powered motors. This said, the electric motors described herein could be coupled with a rectifier, for example, which would provide for the electric motor to operate with an AC power supply (e.g. single or three phases) or even with unpolarized DC inputs. It is a fully variable linear speed motor function of its input voltage. By its construction, the electric motors described herein can produce high and almost constant torque from 0 RPM to its maximum speed, such as but not limited to 30,000 RPM, or 50,000 RPM, or 100,000 RPM.

The following description presents the principles to apply for operation of an electric motor having an asymmetrical configuration, according to at least one embodiment described herein. While one exemplary embodiment is described below, the claims should not be construed as being limited to the exemplary embodiment described below.

Figure 8:
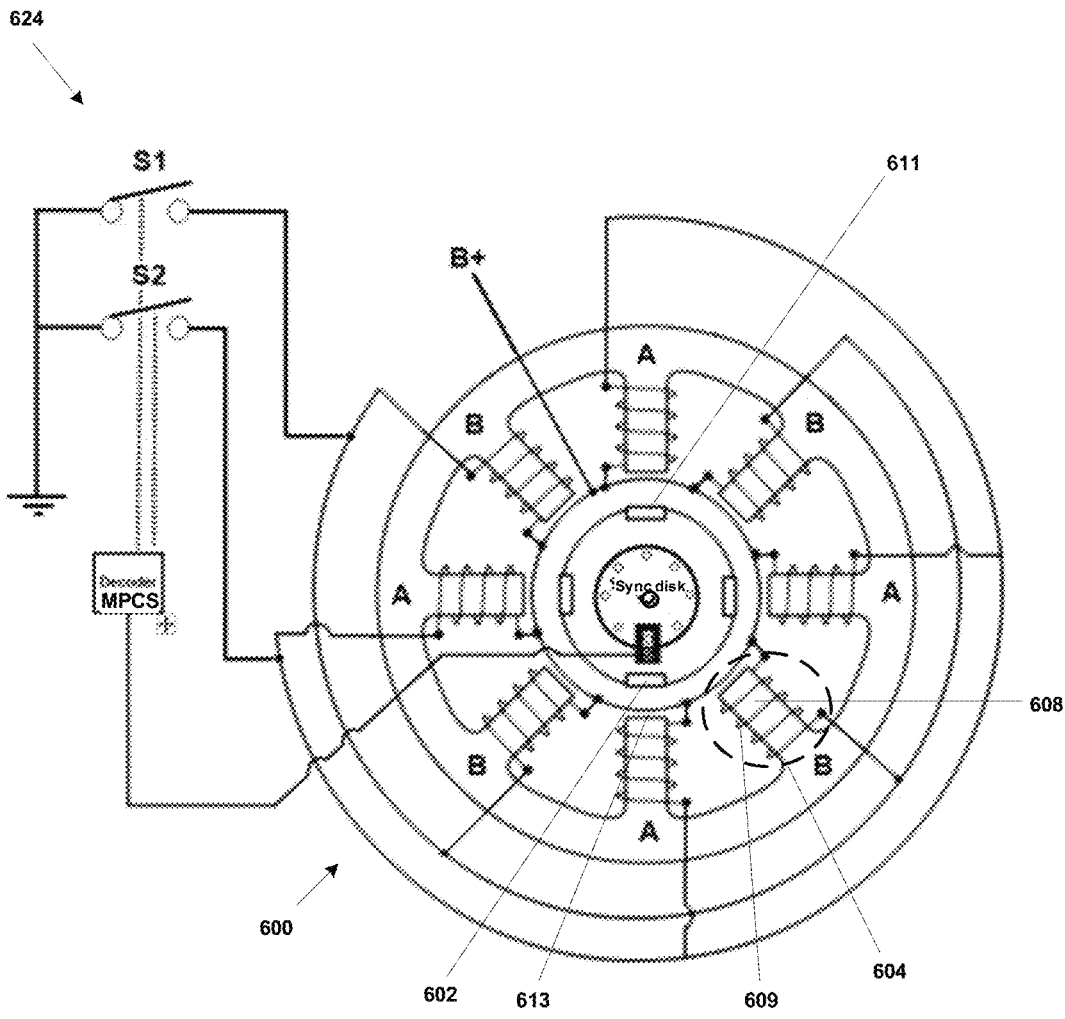
FIG. 8 is a circuit diagram of the electric motor of FIG. 6, according to another embodiment.

FIG. 8 presents a basic schematic of one example of operation of an electric motor according to at least one embodiment described herein. Specifically, FIG. 8 shows the electric motor 600 of FIGS. 6 and 7 having eight stator poles 604 connected in two groups (A-Series and B-Series, which, as shown, alternate in position around the rotor 602) on the stator 605, four permanent magnets 602 on the rotor 606, a synchronization disk 620 on the rotor shaft 601 read by the sensor 622 that is connected to the MPCS 624, as well as the switches S1 and S2 that power the electrical circuits which are themselves managed by the MPCS 624. The input power, herein represented by "B+", is received from a rectifier module (not shown). The input power is ready to provide electrical power needed for the various stator poles 604 while the ground return is accomplished via switches S1 and S2 which are controlled by the MPCS 624.

In this embodiment, each of the four permanent magnets 602 are shown as initially being aligned with a respective A-Series stator pole 604. Referring to the description above, this shows an FMS. At this time, the MPCS 624 knows the position of rotor 606 via the sensor 622 and the synchronization disk 620.

Figure 9:
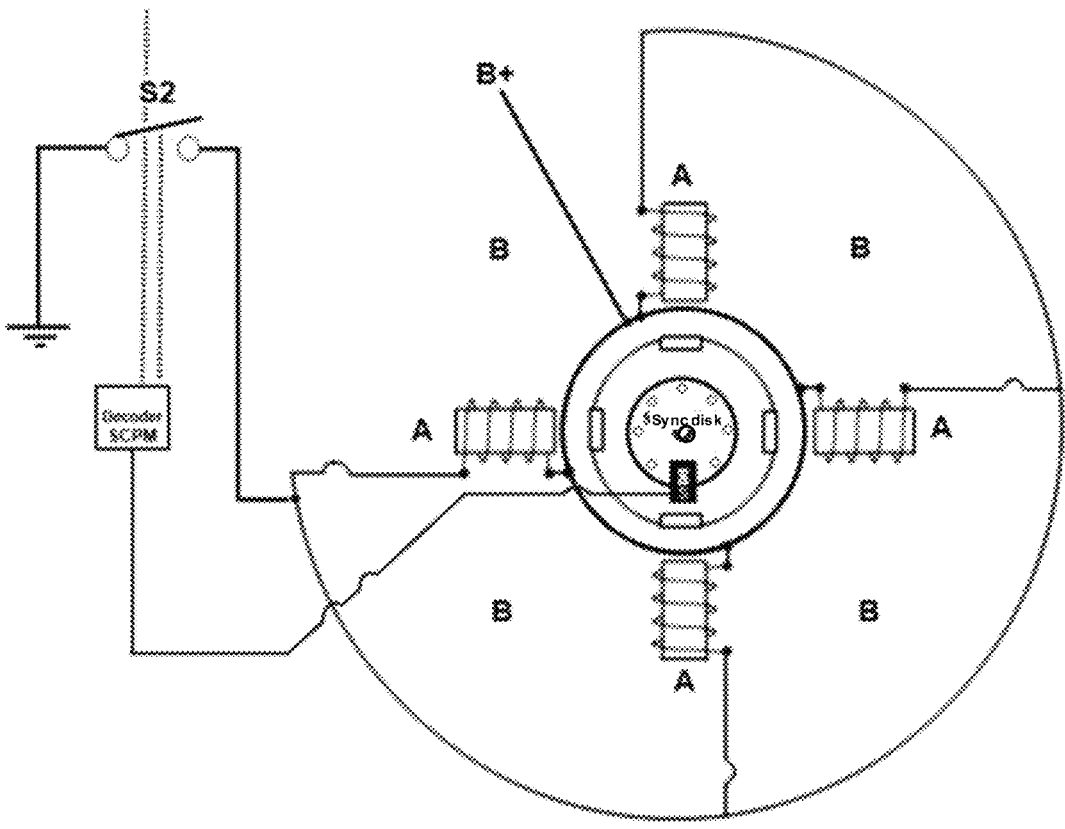
FIG. 9 is a circuit diagram of the electric motor of FIG. 6, showing the motor at a step 0 where rotation of the rotor is initiated.

In MPF Operation Mode, the MPCS 624 activates S2 (or an equivalent switch) and provides current to electric motor 600 (i.e. coils 609) to induce same polarity as the magnets to the ferromagnetic cores 608 and cancel out the attraction effect between the permanent magnets 602 and the stator poles 604 when overcoming the brake point. Generally, coils 609 can control the shape and strength of the magnetic field of each of the ferromagnetic poles 604. At this moment, the permanent magnets 602 become slightly repulsed out of position by FRD from the A-Series stator poles 604 and is being naturally attracted by the next unpowered adjacent ferromagnetic pole. FIG. 9 shows a circuit diagram of this operation. Cancelling out the attraction effect is done by applying an equivalent external energy in a range from 0 to about 75% FMD energy during the equivalent of about 120 degrees over a full rotation. It varies function of the phantom effect expected for a given design.

In Dynamic Operating Mode, the same scenario is repeated with exception that the current induced in the coils 609 is more powerful, thus generating an additional repulsion force on the permanent magnets 602 that favors even more rotation of the rotor 606. At this stage (Step 0), the rotation of rotor 606 is initiated.

Rotor 606 and permanent magnets 602 continue to rotate until permanent magnets 602 are rotationally positioned between the A-Series stator poles 604 and B-Series stator poles 604 (see FIG. 10) and beyond the FMD zone (shown in FIGS. 2A and 2B). At all times, the MPCS 624 knows its position via the sensor 622 and the synchronization disk 620. Regardless of the operation mode selected, the MPCS 624 is configured to disable the switch S2, thus removing power to the A-Series stator poles 604. This is generally set to occur when the permanent magnets 602 have moved to a position in between 3 to 20 degrees of rotation relative to the magnet-to-pole alignment position (e.g. the alignment shown in FIG. 8). In one example herein, 15 degrees was used.

Figure 10:
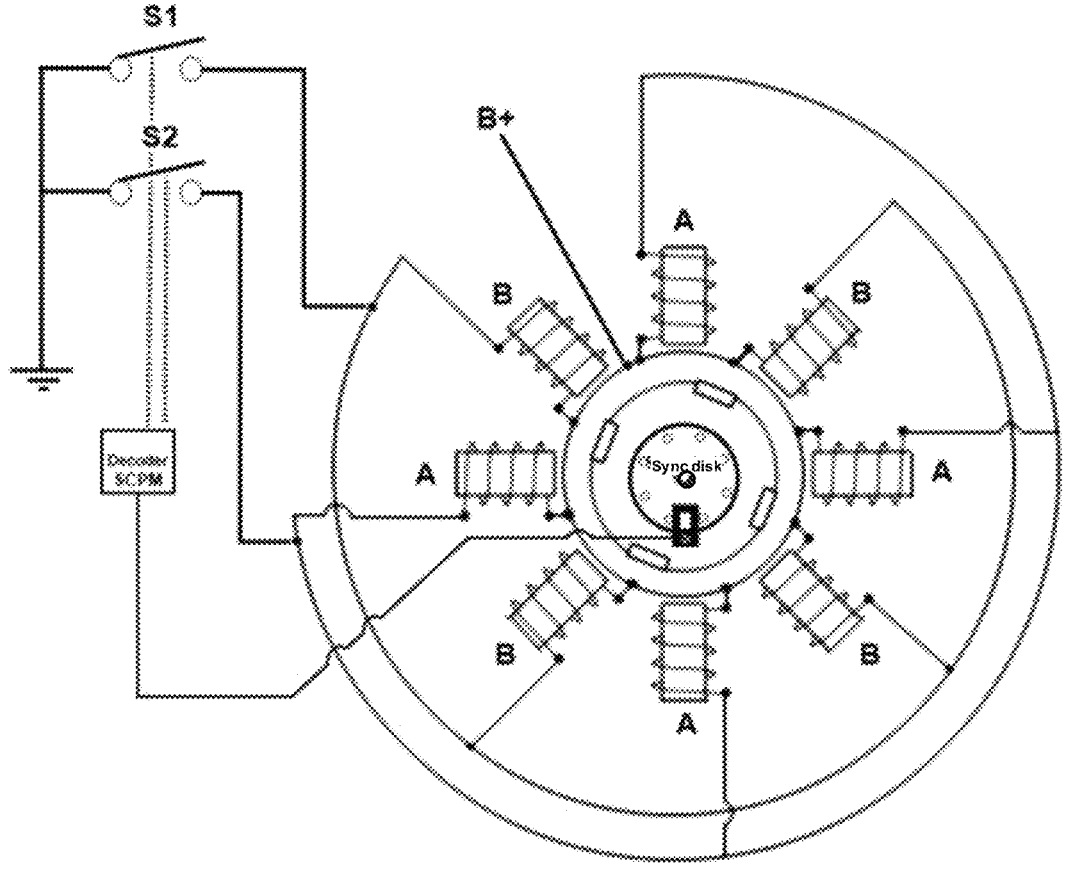
FIG. 10 is a circuit diagram of the electric motor of FIG. 6, showing the motor at a step 1.

The permanent magnets 602 may then be attracted either by A-Series stator poles 604 from which they have just moved away or by the B-Series stator poles 604 which are approaching. The accumulated kinetic energy and inertia of the rotor 606 mass will naturally continue rotation forward towards the B-Series stator poles 604. When a centerline between the A-Series stator poles 604 and B-Series stator poles 604 is crossed by the permanent magnets (e.g. when the permanent magnets are positioned closer to the B-Series stator poles than to the A-Series stator poles), the magnetic attraction to the closest pole takes precedence and adds its energy to the motion. Meaning, in the example herein, the rotor 601 with continue motion without need of any external energy for about 30 degrees of rotation. This is shown in the drawings as the FMD (FIGS. 2A and 2B) on the B-Series stator poles 604. A circuit diagram of this step is shown in FIG. 10.

As rotor 606 continues to rotate, the permanent magnets 602 become aligned with the B-Series stator poles 604. This is represented by the FMS moment, as described above. At this time, the MPCS 624 again knows the position of rotor 606 via the sensor 622 and the synchronization disk 620 of the rotor 606.

Figure 11:
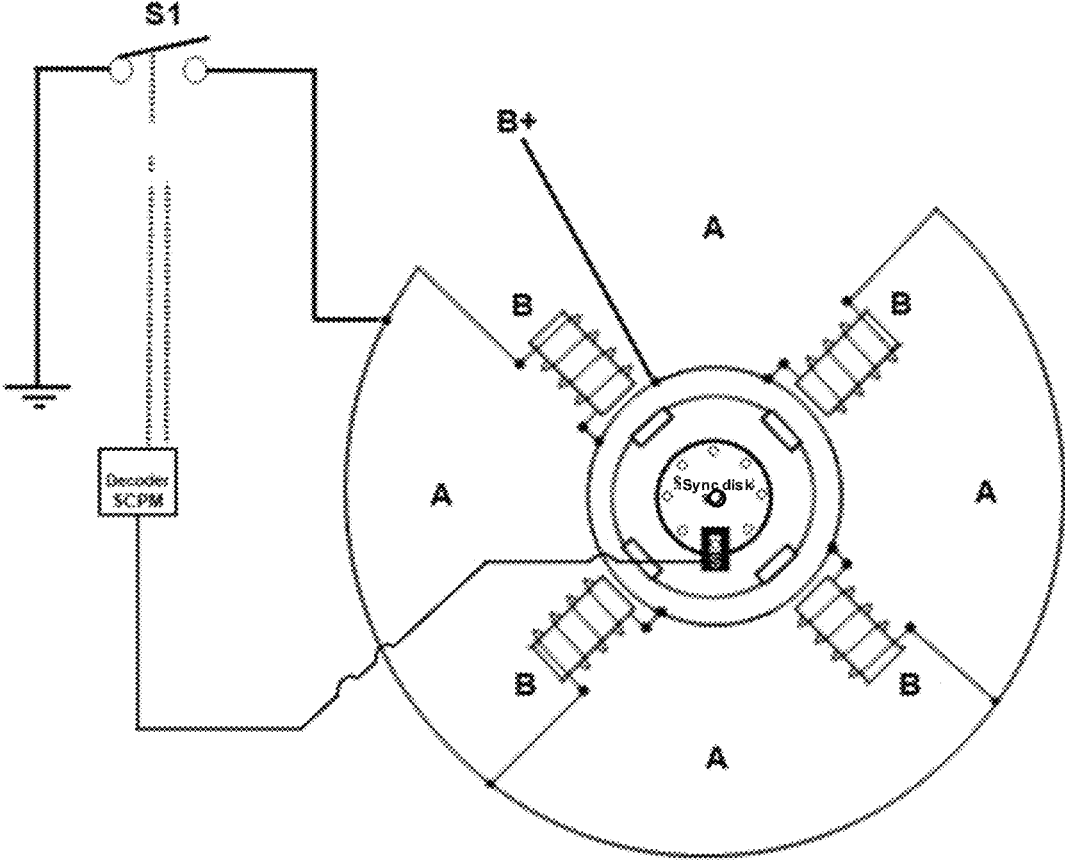
FIG. 11 is a circuit diagram of the electric motor of FIG. 6, showing the motor at a step 2.

In MPF Operation Mode, the MPCS 624 activates switch S1 (or equivalent) and provides enough current to the stator pole 604 (i.e. coils 609) to modulate the polarity of the ferromagnetic cores 608 and cancel out the natural attraction effect between the permanent magnets 602 and the ferromagnetic cores 608. This effect is referred to herein as the "Phantom Moment" when the stator poles 604 are "invisible" to the flux of the permanent magnets 602 to provide for the rotor 606 to freely rotate beyond the "Brake Point". A circuit diagram showing the Phantom Moment is shown in FIG. 11.

In Dynamic Operating Mode the same scenario is repeated with the exception that the current induced in the coils 609 is more powerful than the current induced in MPF Operation Mode, thus generating an additional repulsion force on the magnets 602 that favors even more rotation of the rotor 606.

Figure 12:
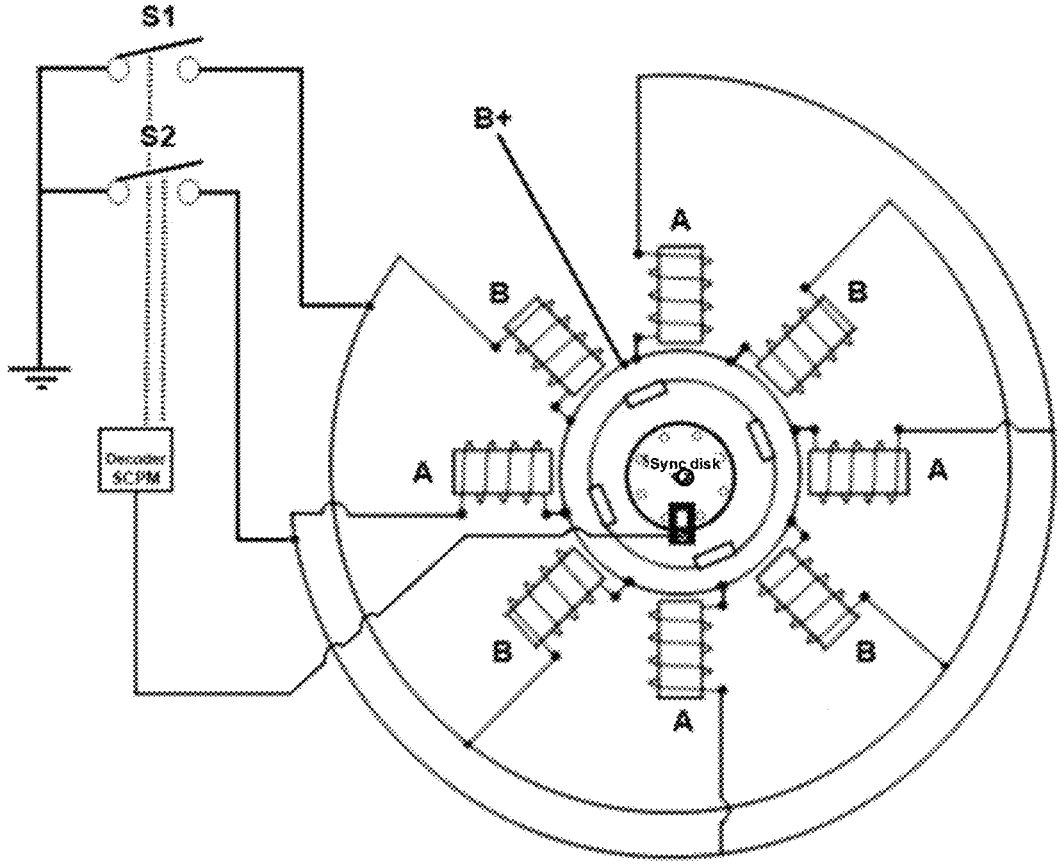
FIG. 12 is a circuit diagram of the electric motor of FIG. 6, showing the motor at a step 3.

Rotor 606 and permanent magnets 602 continue their rotational movement and, as shown in FIG. 12, move to a position between the FMD zone of the A-Series stator poles 604 and B-Series stator poles 604, thus beyond the FMS zone (shown in FIGS. 1A and 1B). It should be understood that at all times, the MPCS 624 knows the position of the rotor 606 via the sensor 622 and the synchronization disk 620 of the rotor 606. Regardless of the operation mode selected, the MPCS 624 disables the switch S1, thus removing power to the B-Series stator poles 604.

Permanent magnets 602 may then be attracted either by B-Series stator poles 604 from which they have just moved away or by the A-Series stator poles 604 which are approaching. This is shown in FIG. 12. The accumulated kinetic energy and inertia of the mass of rotor 606 will, by default, continue rotation forward towards the A-Series stator poles 604. When the permanent magnets 602 cross a centerline between A-Series stator poles 604 and the B-Series stator poles 604, the magnetic attraction between each permanent magnet 602 and a respective ferromagnetic core 609 takes precedence and adds its energy to the rotation of rotor 606 and is being naturally attracted by the next unpowered adjacent ferromagnetic pole. This is referred to as the FMD (see FIGS. 2A and 2B) on the A-Series stator poles 604.

Permanent magnets 602 then return to Step 0 (shown in FIG. 8). The cycle described above can be repeated by the MPCS 624 continuing to control the delivery of current to the stator 605. In the example shown in the figures, four cycles (as described above) equate to one full turn of a rotor.

Back-Iron Effect

Figures 13A, 13B:
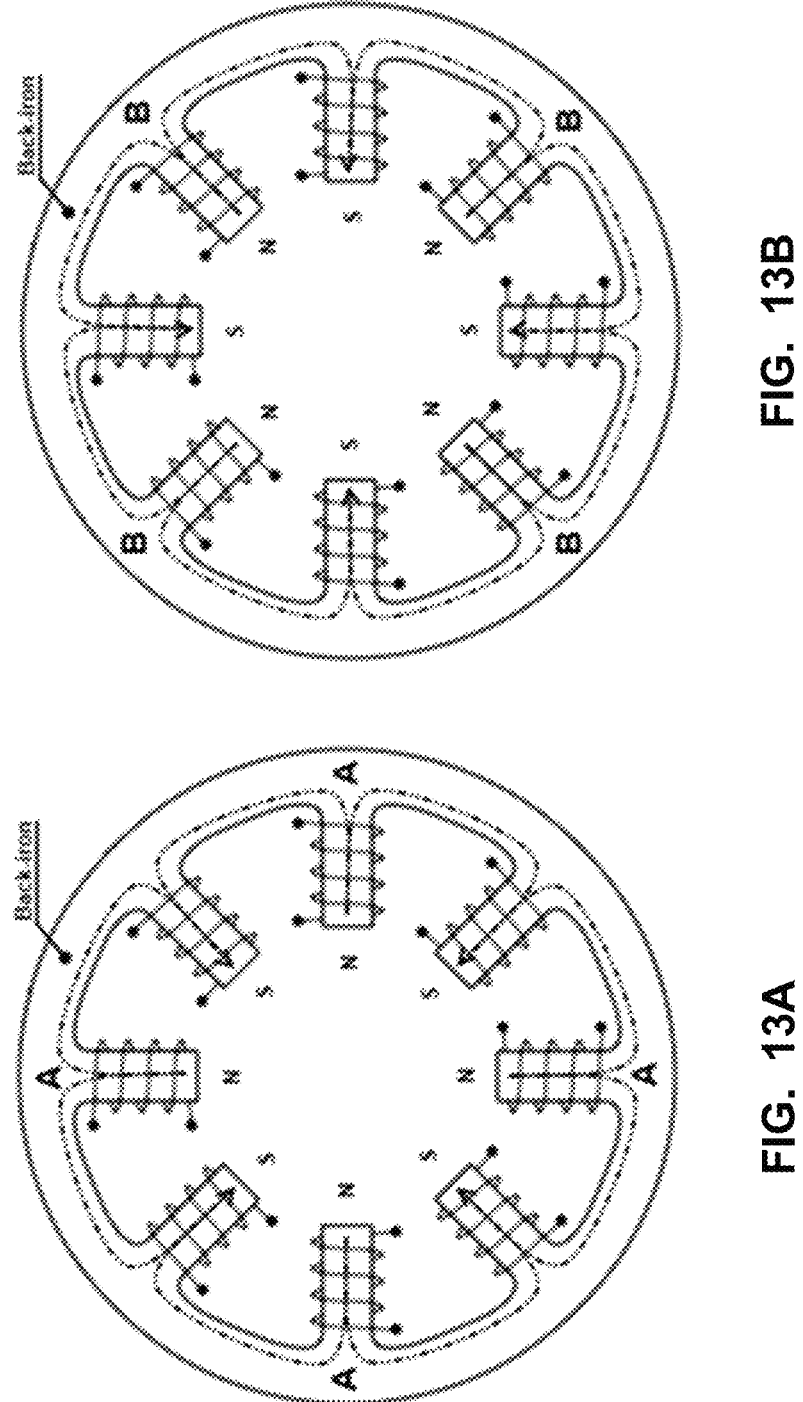
FIG. 13A shows a top view of an electric motor having each of its stator poles connected to each of the other stator poles on the same magnetic circuit, each of the stator poles being at a first polarity.
FIG. 13B shows a top view of an electric motor having each of its stator poles connected to each of the other stator poles on the same magnetic circuit, each of the stator poles being at a second polarity.

In some embodiments, at step 0 (see FIG. 9) and step 2 (see FIG. 11), another phenomenon may be encountered. For instance, for the electric motor 600 shown in the figures, when each of the stator poles 604 are interconnected through the back-iron 607, energizing one of the sets A or B of stator poles 604 creates a similar but opposite effect on the adjacent set of stator poles 604, without external power applied to the later set of stator poles 604. This is possible when each of the stator poles 604 is connected to each of the other stator poles 604 on the same magnetic circuit (see FIGS. 13A and 13B). In fact, the magnetic lines of force, inside the core 608, simply find, via the back-Iron 607, the least resistant path to circulate around and adopt it. For electric motor 600, this represents an advantage because a magnetic field of any one stator pole 604 may repulse a nearby permanent magnet 602 of the rotor 606 at the same time that adjacent a magnetic field of an adjacent stator pole 604 attracts the permanent magnet 602. As the strength of the magnetic fields of the stator poles 604 increase, stronger the adjacent poles attract it. Thus, the energy used to energize a pole is adding up to the natural attraction of the magnets towards the iron cores.

Eddy-Current Effect

By definition, "Eddy currents (also called Foucault's currents) are loops of electrical current induced within conductors by a changing magnetic field in the conductor according to Faraday's law of induction. Eddy currents flow in closed loops within conductors, in planes perpendicular to the magnetic field. They can be induced within nearby stationary conductors by a time-varying magnetic field created by an AC electromagnet or transformer, for example, or by relative motion between a magnet and a nearby conductor. The magnitude of the current in each given loop is proportional to the strength of the magnetic field, the area of the loop, and the rate of change of flux, and inversely proportional to the resistivity of the material. When graphed, these circular currents within a piece of metal look vaguely like eddies or whirlpools in a liquid."

In the electric motors described herein, eddy-current effects can generate heat when the stator poles are energized and when the ferromagnetic cores are switching polarity. Eddy-current effects may be minimized in the electric motors described herein by limiting a duration of when the polarizing pulse is applied to the stator poles when compared to a duration between two pulses, which can be referred to as an unenergized duration. Limiting the duration of when the polarizing pulse is applied to the stator poles may provide for iron molecules in the ferromagnetic cores to naturally regain their natural polarization without being jostled. This thermal efficiency may increase the performance of the electric motors described herein.

Forced Versus Natural Motion

It should be understood that in the electric motors described herein, unlike other traditional electric motors where the rotor is forced to follow a rotating magnetic field, each step described can be sequenced to follow the natural attraction pace of the permanent magnets of the rotor from one stator pole to another. External power to the stator poles can be applied precisely (e.g. only when the permanent magnets are, for example, a few degrees (3 to 20 degrees for a total of 120 degrees over a full rotation) away from a midline of the ferromagnetic core of a stator pole). In traditional electric motors, if the rotor is blocked or is overloaded, the motor will generally overheat and burn. In the electric motors described herein, if the rotor becomes blocked or is overloaded, the motor can by default enter into Dynamic Brake Mode and requires no energy input, thus self-protecting electrical components of the motor.

For this reason, in the example shown herein, at step 0 (see FIG. 9), the rotor 606 can only rotate if a rotation is induced on the rotor 606. Otherwise, rotor 606 naturally remains in Brake Mode. Therefore, to start the electric motors described herein, for example, either an external rotational force or an electronic circuit that can perform a start-up sequence to initiate a small rotational motion on the rotor is needed.

Operation Modes Characteristics

As described previously, in the electric motors described herein, several operating modes are possible. Each operating mode has characteristics that can be better suited for given applications depending on the needs of the motor. The flexibility of the electric motors described herein provide for very sharp, application centric, adjustments. For instance, on the same motor, it may be possible to switch from one mode to another event during operation.

In MPF Operation Mode

The MPF Operation Mode is configured to provide for high efficiency while developing high torque. The example shown herein demonstrates high efficiency with possibilities of producing a positive gain in some working conditions. It also permits very low up to very high rotational speeds. The example shown herein was tested at speeds ranging from 300 RPM to 23,000 RPM (limited only by the materials used for the prototype components). It should be understood that the rotational speed of the electric motors described herein operating in MPF Operation Mode is generally a linear function of the input voltage. In this mode, the kinetic energy regeneration and the Back-EMF energy recovery is possible using generally known electromagnetics laws and principles. More precisely, the regeneration of kinetic energy is done by taking benefit of the movement of the magnets magnetic flux crossing the stator poles during rotation. Thus, re-converting partially the electromotive forces back to electrical energy following Lenz's law. The back-EMF energy recovery is done taking benefit of the drop of the magnetic flux of any given pole when it is deactivated. Both being sources of energy temporarily stored in an MPF motor during operation.

In Dynamic Operation Mode

Dynamic Operation Mode, which can also be referred to as a "boost" mode, works similarly to the MPF Operation Mode described above. An electric motor operating in Dynamic Operation mode as described herein may include the same parts as an electric motor operating in MPF Operation Mode, as described above, and may not have usage limits. Dynamic Operation Mode may require an increased amount of external power input to operate when compared with the MPF Operation Mode. In some embodiments described herein, up to three times the initial voltage may be required to demonstrate Dynamic Operation Mode functionalities and performance. The maximum voltage applied may be limited by the prototype design, the components and the materials selection. When activated, Dynamic Operation Mode can quickly increase the mechanical performance of the electric motors described herein. The electric motors described herein can operate in Dynamic Operation Mode for very long periods of time, as needed. In this mode, similar to MPF mode, the kinetic energy regeneration and the Back-EMF energy recuperation are also possible. Moreover, they would be even more important because the magnetic flux circulating within the stator poles will also be greater due to increase amperage circulating in the coils 609 in this operating mode.

In Dynamic Brake Mode

Figure 14B:
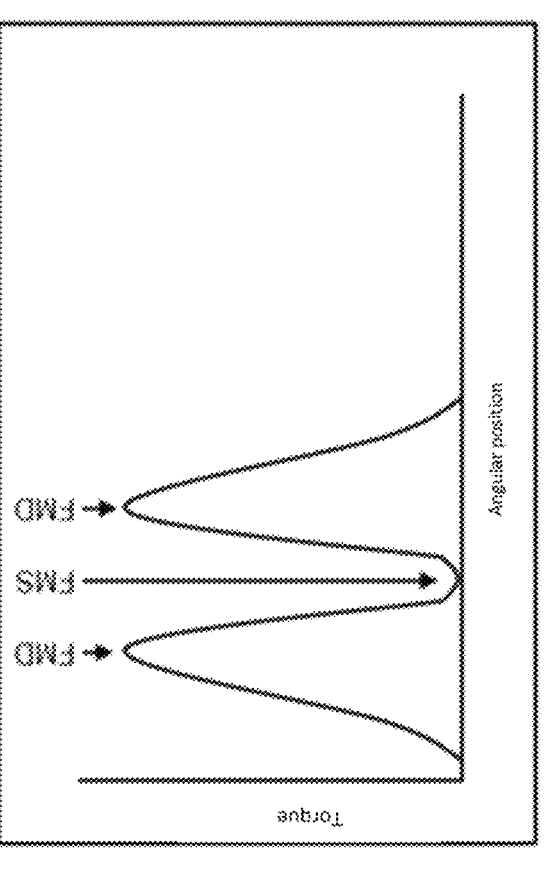
FIG. 14B is a graph showing the change in torque for angular position of the rotor shown in FIG. 14A of the Dynamic Brake Mode.

The Dynamic Brake Mode is also a natural operation mode for the electric motors described herein. Dynamic Brake Mode is applied when the permanent magnets of the rotor are aligned with the stator poles, also referred to as the FMS zone (see FIGS. 14A and 14B). Dynamic Brake Mode provides for rapid rotor deceleration when the power is cut off. Dynamic Brake Mode can also lock, with full torque, the rotor within the stator with the rotor is stopped and without need of any external input power. Dynamic Brake Mode can also be modulated and controlled as needed. For instance, gentle progressive braking can be realized, and more aggressive and almost immediate complete emergency stops can also be realized. Here again, Dynamic Brake Mode provides for a multitude of possible applications where static and dynamic braking are needed. Dynamic Brake Mode can be activated at any time and can even be used to regenerate electrical energy, re-converting the electromotive forces back to electrical energy following Lenz's law.

In Start-up Mode

Start-up mode is an optional mode of operation for the electrical motors described herein that is completely managed by the MPCS. Start-up mode is an alternative mode used only during start-up of the electrical motors described herein to initiate rotation without the need of an external torque.

Figure 14A:
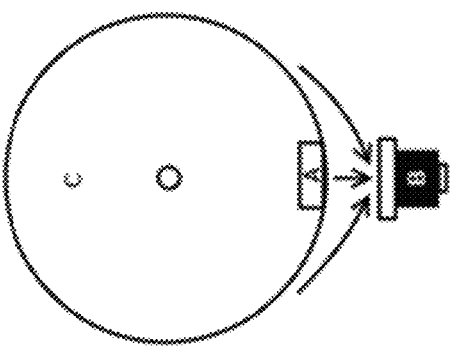
FIG. 14A is a top view of the rotor, the permanent magnet and the stator pole of FIG. 6 during Dynamic Brake Mode, according to one embodiment.
Figure 15B:
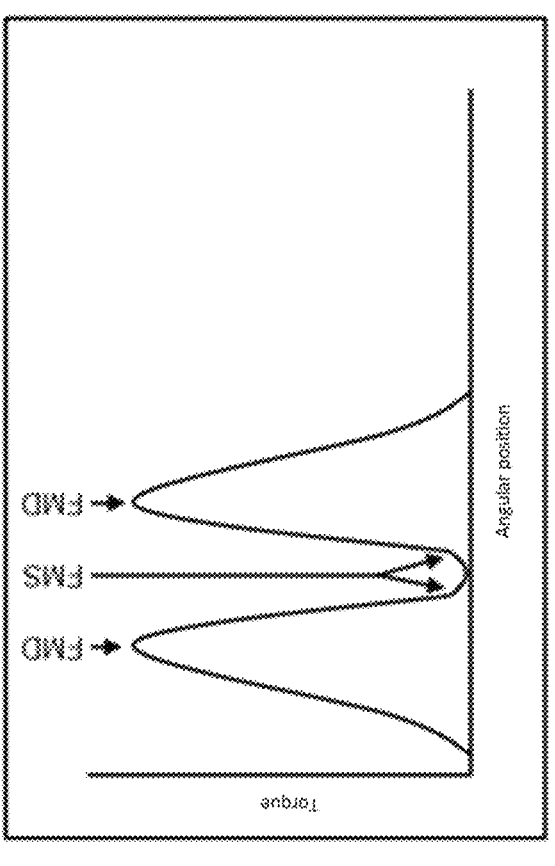
FIG. 15B is a graph showing the change in torque for angular position of the rotor shown in FIG. 15A of the Oscillating Zone at start-up.
Figure 15A:
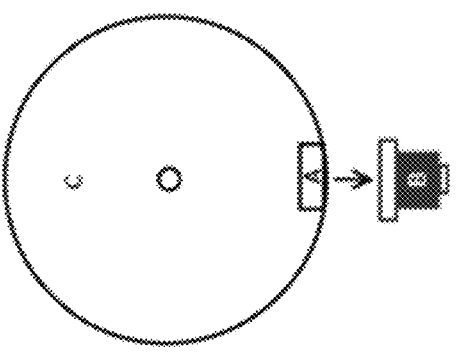
FIG. 15A is a top view of the rotor, the permanent magnet and the stator pole of FIG. 6 in the Oscillating Zone, according to one embodiment.

At the beginning of a start-up operation, the electrical motors described herein are generally in dynamic brake mode (see FIG. 14A). From this point, when the stator pole coils are being energized, the force balance is temporarily broken thus providing for the rotor to rotate. This is the beginning of the start-up phase (see FIGS. 15A and 15B). At this stage, the direction of rotation is undefined and will happen in the direction of the least resistance.

Figures 16A, 16B:
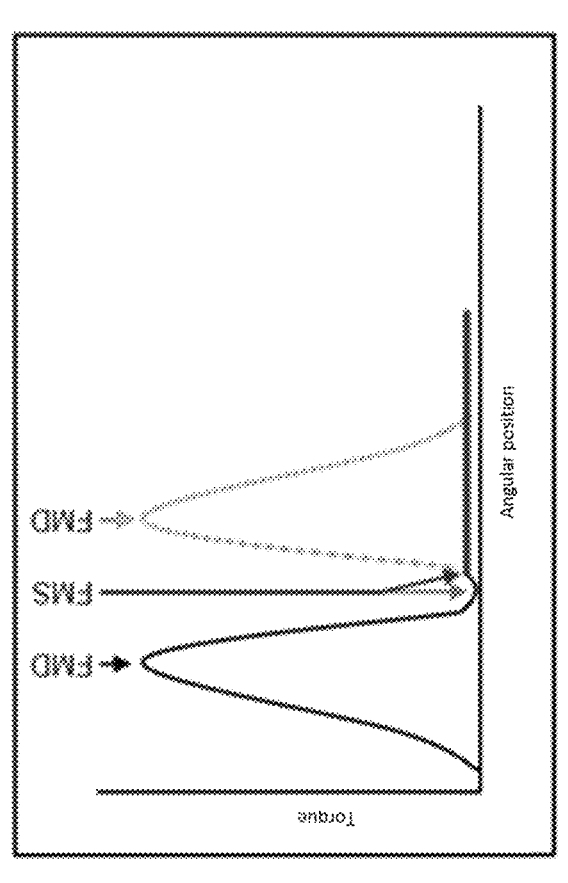
FIG. 16A is a top view of the rotor, the permanent magnet and the stator pole of FIG. 6 at during start-up, according to one embodiment.
FIG. 16B is a graph showing the change in torque for angular position of the rotor shown in FIG. 16A of the start-up in the desired direction.
Figure 17B:
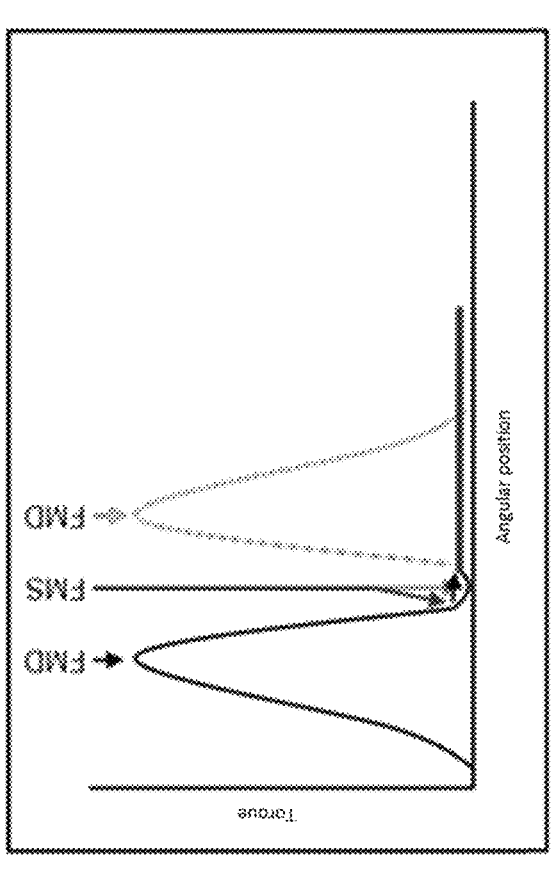
FIG. 17B is a graph showing the change in torque for angular position of the rotor shown in FIG. 17A of the start-up in the opposite direction.
Figure 17A:
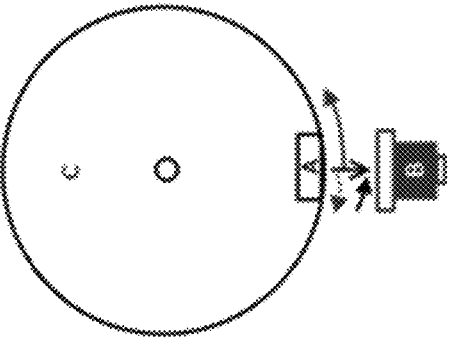
FIG. 17A is a top view of the rotor, the permanent magnet and the stator pole of FIG. 6 at during start-up, according to another embodiment.

The MPCS, which detects the direction of rotation, will keep sending power to a given set of stator poles as long as it detects movement in the intended direction. It will keep powering up the same coils long enough to overpass the FMD zone and until the permanent magnets reach the centerline window between two stator poles (see FIGS. 16A and 16B).

If the MPCS detects a movement in the opposite direction to the desired rotation, the MPCS will interrupt the power feed of the coil. In doing so, the permanent magnet will return in the other direction under the attraction effect of the stator pole core. The reverse movement is large enough to overpass the FMS and is just enough for the MPCS to detect a movement in the right direction. Then power will be reapplied on the same coils long enough to overpass the FMD zone and until the permanent magnets reach the centerline window between two stator poles (see FIGS. 16A and 16B).

These start-up steps may be repeated until the rotor gets enough velocity for the electric motors described herein to rotate at speeds sufficient for other modes of operation described herein to take over control.

It should be noted that at the beginning of the start-up the rotor movement is more of an oscillation around FMS zone. Then, this movement gains rapid amplitude and power under a pendulum effect caused by successive permanent magnets to stator poles attraction and repulsion cycles at their strongest points. This then can provide the electric motors described herein to start at full torque. In addition, the direction of rotation is controlled and completely managed by the MPCS. The MPCS can provide a single MPF Motor to rotate in either direction and may even change direction of rotation while operating, if desired. Moreover, the motor ramp-up or ramp-down can be fully controlled also via the MPCS.

Other Characteristics

Permanent magnets of the rotor of the electric motors described herein may always be in attraction mode, while the active poles may always be in repulsion mode. The electric motors described herein can be either rotative or linear. The electric motors described herein can efficiently convert electrical power to mechanical torque/force and vice versa. In the example described herein, the injection of external power represents, for example, about 108 degrees out of 360 degrees of rotation. In the example herein, the prototype, ran without issue at 20,000 RPM. However, when exceeding 23,000 RPM, the same prototype started showing signs of mechanical weakening's. Thus, in the motors described herein, rotation speeds of the motors can theoretically approach the speed of attraction (i.e. speed at which two magnets move towards each other) of two adjacent permanent magnets, which varies based on the strength, the shape of the permanent magnets and the relative distance between the magnets and the pole's ferromagnetic cores. In reality, the maximum speed is physically limited by the nature of the magnetic flux, the design, the components selection and the materials used.

The following is non-exhaustive list of potential benefits and attributes of some of the embodiments described herein:

In some embodiments, the rotational speed can be adjusted by the MPCS or linearly by the outside power supply voltage.

In some embodiments, the electric motor can operate under AC or DC power supplies, one or more phases depending on its configuration.

In some embodiments, the electric motor may or may not have constant torque.

In some embodiments, the electric motor may naturally have a dynamic brake.

In some embodiments, the electric motor can recover energy from the Back-EMF and/or the dynamic braking and/or the electromotive forces.

In some embodiments, the electric motor may recover induced electromotor forces (Faraday's Law).

In some embodiments, the electric motor can regulate its rotational speed regardless of its load or its power supply.

In some embodiments, the electric motor may have rapid or slow acceleration or deceleration curves, modulated or not.

In some embodiments, the electric motor, with an external energy supply, can multiply the power of its dynamic brake.

In some embodiments, the electric motor can achieve a constant torque, without drop-off zone (slip).

In some embodiments, the electric motor can achieve a constant torque throughout its speed range.

In some embodiments, the electric motor can manifest a very low speed range (e.g. less than 10 RPM) to a very high speed (e.g. more than 30,000 RPM).

In some embodiments, the electric motor may or may not have a locked rotor while not rotating and it can turn into a dynamic brake if its power is exceeded.

In some embodiments, the electric motor may or may not have a free spinning, no load, rotor operation mode (no acceleration, no braking, just inertial rotation).

In some embodiments, the electric motor may be constructed using different form factors, such as but not limited to a rotary, a linear or a wheel hub motor variant.

In some embodiments, the electric motor can be completely autonomous having all its control embedded inside the motor.

In some embodiments, the electric motor can be manually controlled, remotely controlled, wireless controlled or controlled by other systems.

In some embodiments, the electric motor may or may not be self starting.

In some embodiments, the electric motor can operate and can be controlled on demand rotating clockwise (CW) or counter clockwise (CCW).

In some embodiments, the MPF motor produces little to no heat compared to conventional AC or DC motors.

In some embodiments, the MPCS automatically selects and modulates operation modes during operation for best efficiency and performance.

Methods of controlling an electric motor are also described herein. In a broad aspect, an motor having a stator having at least one independent pole or pole circuit generally equally spaced along the stator, the independent pole or pole circuit being alternating around a periphery of the stator, may be controlled by initiating movement of a mobile component of the electric motor by controllably delivering a first modulated electric pulse to an electric coil surrounding a ferromagnetic core of a first stator pole of the stator when the ferromagnetic core is opposed to and magnetically attracted to a permanent magnet coupled to the mobile component of the electric motor. As MPCS, which detects the direction of rotation, keeps sending power to a given set of stator poles as long as it detects movement in the intended direction, it will keep powering up the same coils long enough to overpass the FMD zone and until the permanent magnets reach the centerline window between two stator poles. As MPCS detects a movement in the opposite direction to the desired rotation, the MPCS will interrupt the power feed of the coil. In doing so, the permanent magnet will return in the other direction under the attraction effect of the stator pole core. The reverse movement is large enough to overpass the FMS and is just enough for the MPCS to detect a movement in the right direction. Then, power will be reapplied on the same coils long enough to overpass the FMD zone and until the permanent magnets reach the centerline window between two stator poles.

These start-up steps may be repeated until the mobile component gets enough velocity for the electric motors described herein to rotate at speeds sufficient for other modes of operation described herein to take over control. As the permanent magnet rotates away from the first stator pole towards a second stator pole of the electric motor, when reaching the second stator pole, a second modulated electric pulse is controllably delivered to a ferromagnetic core of the second stator pole to generate a repulsive magnetic flux of the ferromagnetic core of the second stator pole to cancel an attraction force between the permanent magnet and the ferromagnetic core of the second stator pole.

In a broad aspect, a method of controlling an electric motor having a stator having at least one independent pole or poles circuit generally equally spaced along the stator, the independent poles or pole circuits being alternating around a periphery of the stator, is described herein. The method includes initiating rotation of the electric motor by applying an external torque to the rotor and/or shaft. As MPCS, which detects rotation, keeps sending power to a given set of stator poles, it will keep powering up the same coils long enough to overpass the FMD zone and until the permanent magnets reach the centerline window between two stator poles while the magnet is naturally attracted by the next adjacent ferromagnetic pole.

In at least one embodiment, as the permanent magnet rotates away from the first stator pole towards a second stator pole of the electric motor, when reaching the second stator pole, the method includes controllably delivering a second modulated electric pulse to a ferromagnetic core of the second stator pole to generate a repulsive magnetic flux of the ferromagnetic core of the second stator pole to cancel an attraction force between the permanent magnet and the ferromagnetic core of the second stator pole, while the magnet being attracted naturally by the next adjacent ferromagnetic pole.

In at least one embodiment, the permanent magnet rotates away from the second stator pole and, when reaching a third stator pole, the method includes controllably delivering a third modulated electric pulse to a ferromagnetic core of the third stator pole to generate a repulsive magnetic flux of the ferromagnetic core of the third stator pole to cancel and/or to repulse an attraction force between the permanent magnet and the ferromagnetic core of the third stator pole, while the magnet being attracted naturally by the next adjacent ferromagnetic pole.

In another broad aspect, a method of controlling an electric motor having a stator having at least one independent poles or pole circuits of stator poles generally equally spaced along the stator, the independent poles or pole circuits alternating around a periphery of the stator is described herein. The method includes, when each permanent magnet of the rotor is aligned with a ferromagnetic core of a respective stator pole of the stator, each stator pole having an electric coil surrounding the ferromagnetic core, initiating rotation of the rotor by controllably delivering a first modulated electric pulse to the electric coil of each stator pole. When each respective permanent magnet of the rotor is positioned between its respective stator pole and a respective adjacent stator pole, the method also includes de-energizing each of the coils. When each respective permanent magnet of the rotor reaches its respective adjacent stator pole, the method includes controllably delivering a second modulated electric pulse to the electric coil of each stator pole to generate a repulsive magnetic flux of the ferromagnetic core to cancel and/or to repulse an attraction force between each respective permanent magnet and the ferromagnetic core of its respective adjacent stator pole.

EXAMPLES

Table 1, below, provides five non-limiting examples of prototype devices produced according to at least one of the embodiments described above. Each of the prototypes that were produced had different characteristics, as shown in Table 1.

TABLE 1

| | | | | | |
|---|---|---|---|---|---|
| Comparison of Different Prototypes | | | | | |
| Characteristics | V1 | V2 | V3 | V4 | Test Motor-Pump Application |
| Number of magnets | 2 | 4 | 4 | 26 | 6 |
| Number of poles | 1 | 8 | 8 | 1-2 | 3-6 |
| Rotor diameter | 21 mm | 21 mm | 21 mm | 120 mm | 213.5 mm |
| Controller type | Reflex | Reflex/Disk | Reflex/Disk | Controller | Controller |
| Sensor type | Magnetic | Magnetic | Magnetic | Magnetic/Feedback | Magnetic/Feedback |
| Starting method | Manual | Manual | Manual/Auto | Manual/Auto | Auto |
| Brake | Static | Static | Static | Static | Static |
| Regeneration | No | Without/back EMF | Without/back EMF | Without/back EMF | Without/back EMF/FEM |
| Rotation | CW/CCW | CW/CCW | CW/CCW | CW/CCW | CW/CCW |

Table 2 shows various outputs that were measured during experiments conducted with each of the prototypes described in Table 1.

TABLE 2

Various outputs measured during experiments conducted using the prototypes described in Table 1.

| Description | V1 | V2 | V3 | V4 | Test Motor-Pump Application |
|---|---|---|---|---|---|
| Voltage range/pole (Volts) | — | 1.57-5.5 | 1.57-7.75 | 7-31 | 12-38 |
| Current range/pole (Amps) | — | 0.14-0.374 | 0.14-0.36 | 0.039-0.0814 | 0.226-0.77 |
| RPM range | ~3000 RPM | 1463-11320 RPM | 857-23076 RPM | 659-2120 RPM | 70-1435 RPM |
| Steady state temperature rise | 0° C. | 4.8° C. | 4.8° C. | 0° C. | 5.7° C. |
| Measured efficiency according to configuration | — | — | Yes | N/A | N/A |
| Operating mode | MPF/Dynamic | MPF/Dynamic | MPF/Dynamic | MPF/Dynamic | MPF/Dynamic |
| Regeneration of EMF | N/A | N/A | Back EMF demonstrated | Back EMF demonstrated | Back EMF-FEM demonstrated |

Table 3 shows a summary of characteristics that were validated with each of the prototypes described in Table 1.

TABLE 3

Summary of characteristics validated with the prototypes described in Table 1.

| Purpose of Testing | V1 | V2 | V3 | V4 | Test Motor-Pump Application |
|---|---|---|---|---|---|
| MPF conceptual functional feasibility demonstration | succeeded | succeeded | succeeded | succeeded | succeeded |
| Experimentation of different Amp/Turn coil configuration | Not applicable | Not applicable | succeeded | succeeded | succeeded |
| Experimentation of different pole configuration | Not applicable | Not applicable | Not applicable | succeeded | succeeded |
| Experimentation of different magnetic, electric, electronic configuration | Not applicable | Not applicable | Not applicable | succeeded | succeeded |
| Different configuration of sensors and controls | Not applicable | succeeded | succeeded | succeeded | succeeded |
| Different approaches of pulse and control experimentation | Not applicable | Not applicable | Not applicable | succeeded | succeeded |
| Different approaches of regeneration | Not applicable | Not applicable | succeeded | succeeded | succeeded |
| Different approaches of dynamic and/or static breaking control | Not applicable | Not applicable | Not applicable | Not applicable | Not Applicable |
| Different approaches of control configuration | Not applicable | Not applicable | Not applicable | succeeded | succeeded |
| Different approaches magnets VS poles interaction | Not applicable | succeeded | Not applicable | succeeded | succeeded |
| Different approaches on starting method | Not applicable | Not applicable | succeeded | succeeded | succeeded |
| Different approaches on RPM control | Not applicable | Not applicable | succeeded | succeeded | succeeded |

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

What is claimed is:

1. A method of controlling an electric motor, the motor having a stator having at least one independent pole or pole circuit generally equally spaced along the stator, the independent pole or pole circuit being alternating around a periphery of the stator, the method comprising:

initiating movement of a mobile component of the electric motor by controllably delivering a first modulated electric pulse to an electric coil surrounding a ferromagnetic core of a first stator pole of the stator when the ferromagnetic core is opposed to and magnetically attracted to a permanent magnet coupled to the mobile component of the electric motor; and as the permanent magnet rotates away from the first stator pole towards a second stator pole of the electric motor, the permanent magnet being attracted by a ferromagnetic pole of the second stator pole, controllably delivering a second modulated electric pulse to an electric coil surrounding a ferromagnetic core of the second stator pole when the permanent magnet reaches is aligned with the second stator pole to generate a repulsive magnetic flux of the ferromagnetic core of the second stator pole to overcome an attraction force between the permanent magnet and the ferromagnetic core of the second stator pole, the permanent magnet being attracted to a subsequent unenergized stator pole of the stator, the subsequent unenergized stator pole being positioned in a direction of movement of the mobile component.

2. The method of claim 1 further comprising, after initiating movement of the mobile component by controllably delivering a first modulated electric pulse to an electric coil surrounding a ferromagnetic core of a first stator pole, controllably delivering one or more subsequent modulated electric pulses to the electric coil surrounding the ferromagnetic core of the first stator pole to generate a repulsive magnetic flux of the ferromagnetic core of the first stator pole to promote movement of the permanent magnet away from the first stator pole.

3. The method of claim 1 further comprising, as the permanent magnet rotates away from the second stator pole towards a third stator pole, the permanent magnet being attracted by a ferromagnetic pole of the third stator pole, controllably delivering a third modulated electric pulse to the ferromagnetic core of the third stator pole when the permanent magnet reaches the third stator pole to generate a repulsive magnetic flux of the ferromagnetic core of the third stator pole to cancel an attraction force between the permanent magnet and the ferromagnetic core of the third stator pole.

4. The method of claim 1 further comprising, as the permanent magnet rotates away from the second stator pole towards a third stator pole, controllably delivering a modulated electric pulse to the ferromagnetic core of the second stator pole to generate a repulsive magnetic flux of the ferromagnetic core of the second stator pole to generate a repulsion force between the permanent magnet and the second stator pole to push the permanent magnet towards the third stator pole.

5. A method of controlling an electric motor having a stator having at least one independent pole or pole circuit of stator poles generally equally spaced along the stator, the independent pole or pole circuits alternating around a periphery of the stator, the method comprising:

initiating rotation of the electric motor by applying an external torque or force to the rotor and/or shaft; and as a permanent magnet of the rotor rotates away from a first stator pole towards a second stator pole of the electric motor, the permanent magnet being attracted by a ferromagnetic pole of the second stator pole, controllably delivering a second modulated electric pulse to an electric oil surrounding a ferromagnetic core of the second stator pole when the permanent magnet is aligned with the second stator pole to generate a repulsive magnetic flux of the ferromagnetic core of the second stator pole to overcome an attraction force between the permanent magnet and the ferromagnetic core of the second stator pole, the permanent magnet being attracted to a subsequent unenergized stator pole of the stator the subsequent unenergized stator pole being positioned in a direction of movement of the mobile component.

6. The method of claim 5 further comprising, as the permanent magnet rotates away from the second stator pole towards a third stator pole, the permanent magnet being attracted by a ferromagnetic pole of the third stator pole, controllably delivering a third modulated electric pulse to the ferromagnetic core of the third stator pole when the permanent magnet reaches the third stator pole to generate a repulsive magnetic flux of the ferromagnetic core of the third stator pole to cancel an attraction force between the permanent magnet and the ferromagnetic core of the third stator pole.

7. The method of claim 5 further comprising, as the permanent magnet rotates away from the second stator pole towards a third stator pole, controllably delivering a modulated electric pulse to the ferromagnetic core of the second stator pole to generate a repulsive magnetic flux of the ferromagnetic core of the second stator pole to generate a repulsion force between the permanent magnet and the second stator pole to push the permanent magnet towards the third stator pole.

8. A method of controlling an electric motor having a stator having at least one independent pole or pole circuit of stator poles generally equally spaced along the stator, the at least one independent pole or pole circuit alternating around a periphery of the stator, the method comprising:

when each permanent magnet of the rotor is aligned with a ferromagnetic core of a respective stator pole of the stator, each stator pole having an electric coil surrounding the ferromagnetic core, initiating rotation of the rotor by controllably delivering a first modulated electric pulse to the electric coil of each stator pole;

when each respective permanent magnet of the rotor is positioned between its respective stator pole and a respective adjacent stator pole, de-energizing each of the electric coils of each stator pole; and as each respective permanent magnet of the rotor is aligned with an adjacent stator pole, controllably delivering a second modulated electric pulse to the electric coil of each adjacent stator pole to generate a repulsive magnetic flux of the ferromagnetic core to cancel overcome an attraction force between each respective permanent magnet and the ferromagnetic core of its respective adjacent stator pole, each respective permanent magnet being attracted to a subsequent unenergized stator pole of the stator, the subsequent unenergized stator pole being positioned in a direction of movement of the mobile component.

9. The method of claim 8 further comprising, as the permanent magnet rotates away from the second stator pole towards a third stator pole, the permanent magnet being attracted by a ferromagnetic pole of the third stator pole, controllably delivering a third modulated electric pulse to the ferromagnetic core of the third stator pole when the permanent magnet reaches the third stator pole to generate a repulsive magnetic flux of the ferromagnetic core of the third stator pole to cancel an attraction force between the permanent magnet and the ferromagnetic core of the third stator pole.

10. The method of claim 8 further comprising, as the permanent magnet rotates away from the second stator pole towards a third stator pole, controllably delivering a modulated electric pulse to the ferromagnetic core of the second stator pole to generate a repulsive magnetic flux of the ferromagnetic core of the second stator pole to generate a repulsion force between the permanent magnet and the second stator pole to push the permanent magnet towards the third stator pole.

* * * * *